United States Patent
Yasuki et al.

(10) Patent No.: US 6,373,534 B1
(45) Date of Patent: Apr. 16, 2002

(54) INTELLIGENT DIGITAL TELEVISION RECEIVER

(75) Inventors: Seijiro Yasuki, Kanagawa-ken; Yoshihisa Sakazaki, Kanagwa-ken; Yasuhiro Fujiyoshi; Kenji Shimoda, both of Kanagawa-ken, all of (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 0 days.

(21) Appl. No.: 09/110,393

(22) Filed: Jul. 7, 1998

(30) Foreign Application Priority Data

Jul. 7, 1997 (JP) .............................. 9-181405

(51) Int. Cl.[7] .......................... H04N 7/10; H04N 4/00; H04H 1/02; G06F 3/00
(52) U.S. Cl. ...................... 348/725; 348/469; 348/10; 348/13; 455/6.2; 455/6.3; 345/327; 395/200.97
(58) Field of Search ........................ 348/725, 10, 13, 348/467; 455/6.2, 6.3; 395/200.97; 345/327

(56) References Cited

U.S. PATENT DOCUMENTS

| | | | |
|---|---|---|---|
| 5,563,648 A | * 10/1996 | Menand et al. | 348/13 |
| 5,583,563 A | * 12/1996 | Wanderscheid et al. | 348/13 |
| 5,635,979 A | * 6/1997 | Kosterski et al. | 348/13 |
| 5,768,539 A | * 6/1998 | Metz et al. | 395/200.79 |
| 5,818,440 A | * 10/1998 | Allibhoy et al. | 345/227 |
| 5,973,684 A | * 10/1999 | Brooks et al. | 345/327 |
| 6,005,561 A | * 12/1999 | Hawkins et al. | 345/327 |
| 6,034,732 A | * 3/2000 | Hirota et al. | 348/441 |
| 6,079,566 A | * 6/2000 | Eleftheriadis et al. | 207/101 |

FOREIGN PATENT DOCUMENTS

| | | |
|---|---|---|
| EP | 0680216 | 11/1995 |
| WO | WO96/05699 | 2/1996 |
| WO | WO 96/34466 | 10/1996 |

OTHER PUBLICATIONS

Colaitis, "La Norme MHEG, Video a La Demande Et Television Interactive. The MHEG Standard for Video on Demand and Digital Television Services", Ree: Revue Generale De L'Electricite Et De L'Electronique, No. 4, Oct. 1, 1995, pp. 33–39.

Tsang P H H Et Al., "The Multimedia Information Link Control", Proceedings of the Region Ten Conference (TENCON), Beijing, Oct. 19–21, 1993, pp. 70–73.

* cited by examiner

Primary Examiner—Reinhard J. Eisenzopf
Assistant Examiner—Paulos Natnael
(74) Attorney, Agent, or Firm—Pillsbury Winthrop LLP; Intellectual Property

(57) ABSTRACT

An intelligent digital television receiver for receiving a video signal, an audio signal and a digital data transmitted in a digital broadcast, and for executing an application based on the received digital data by itself or in connection with the received video and/or audio signal. The receiver has a controller for controlling executions of applications by generating events according to event start information bearing time information contained in a digital data stream as an object which comprises an element of the application and another controller for controlling executions of the application.

8 Claims, 25 Drawing Sheets

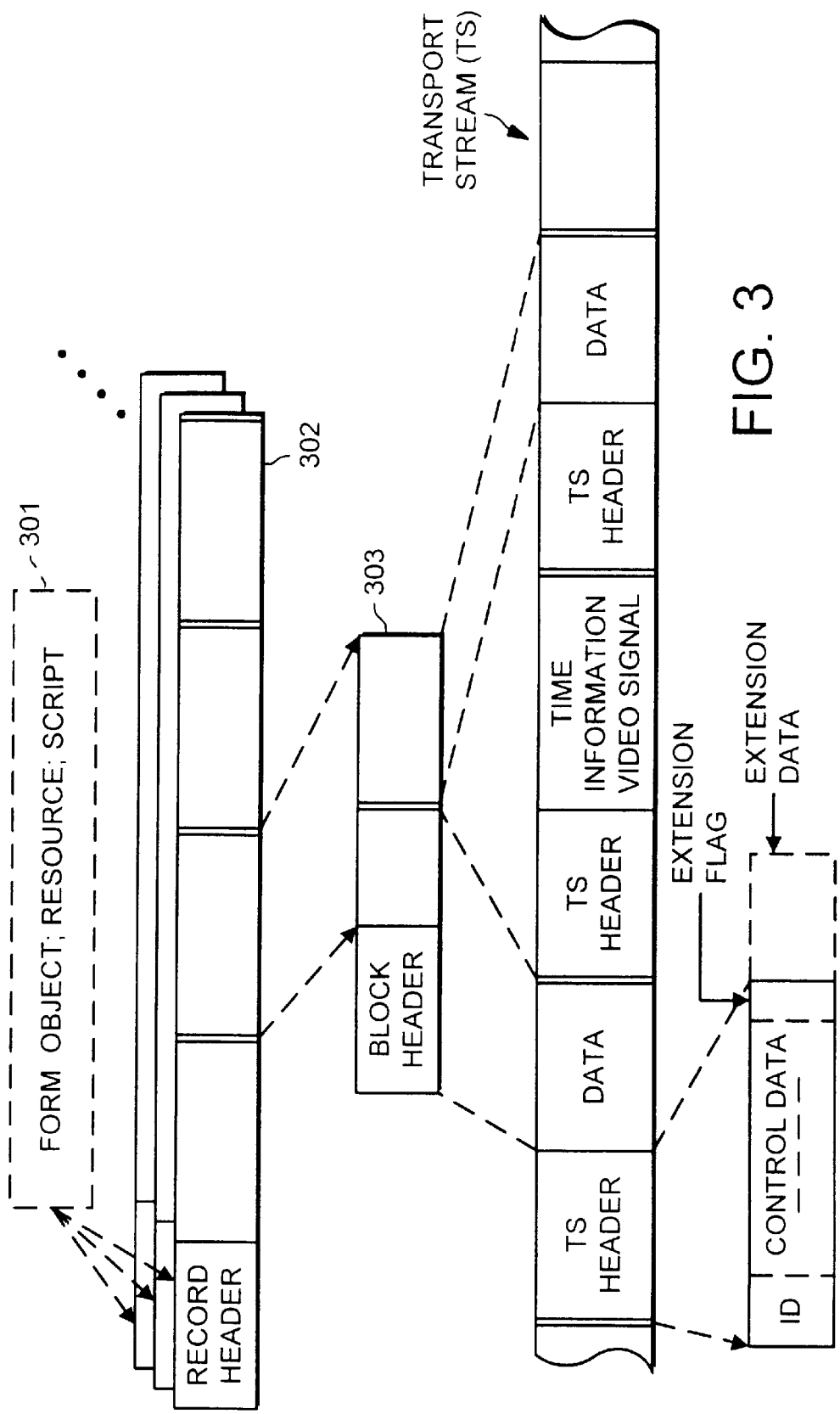

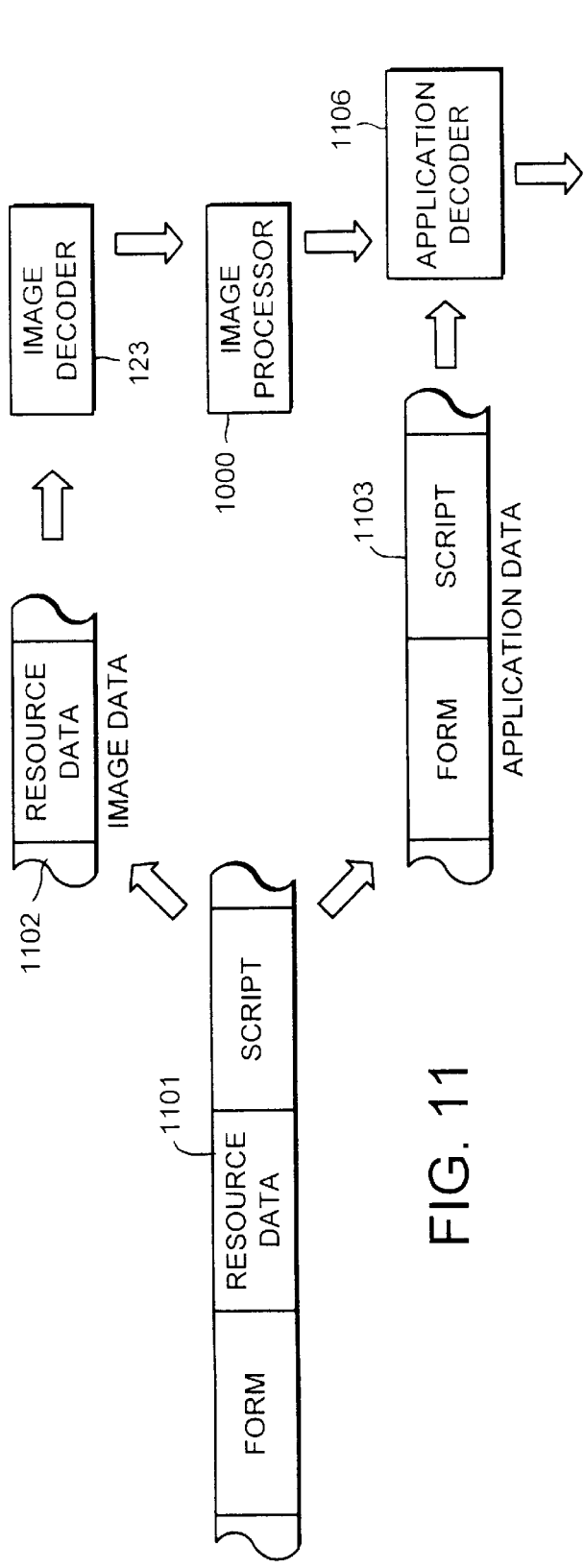
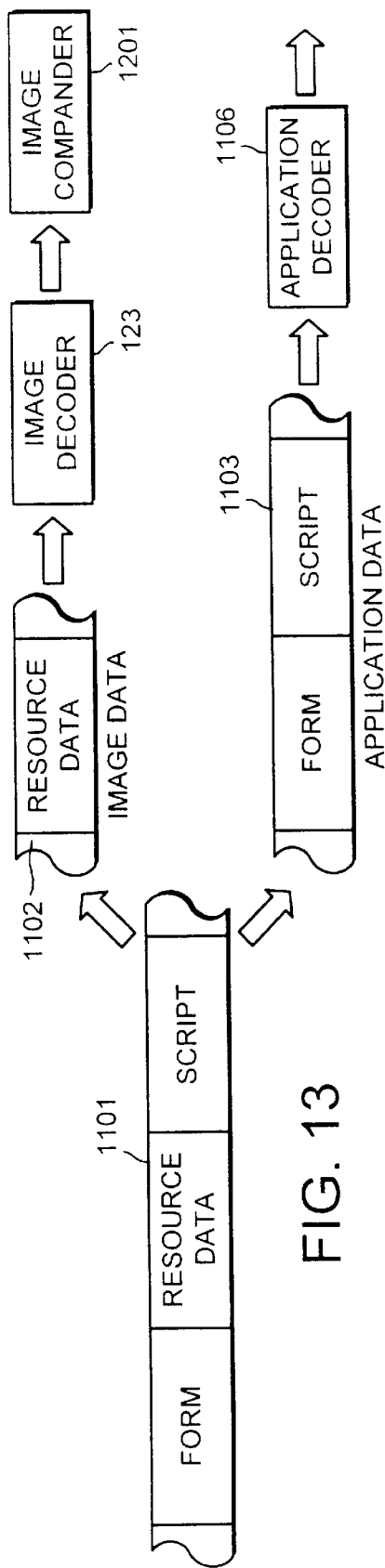
FIG. 11
FIG. 13

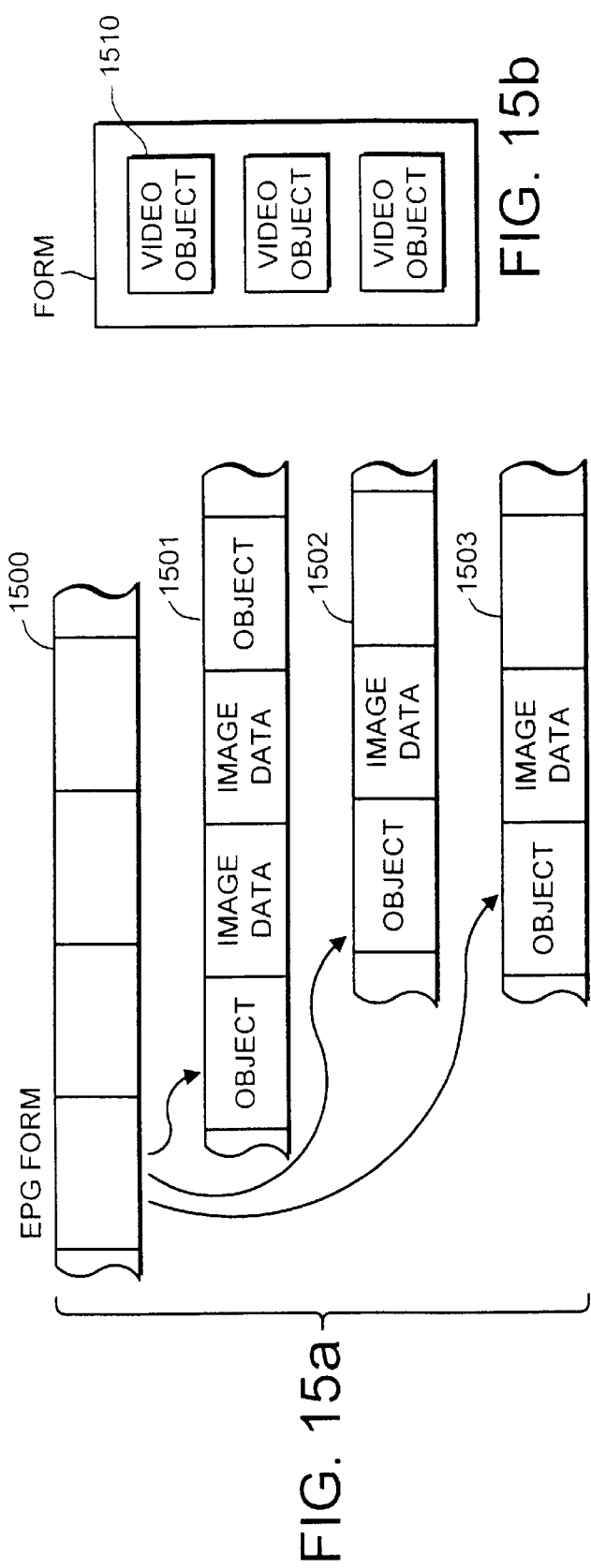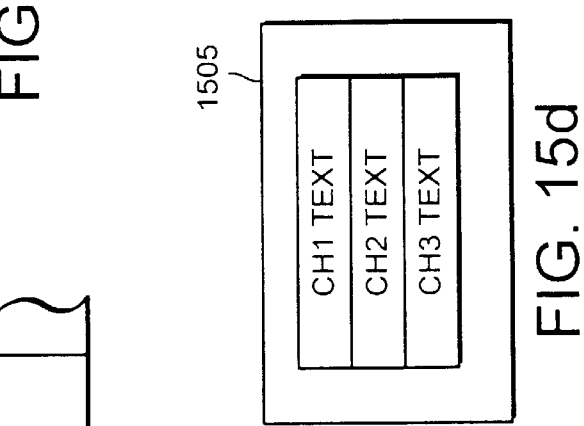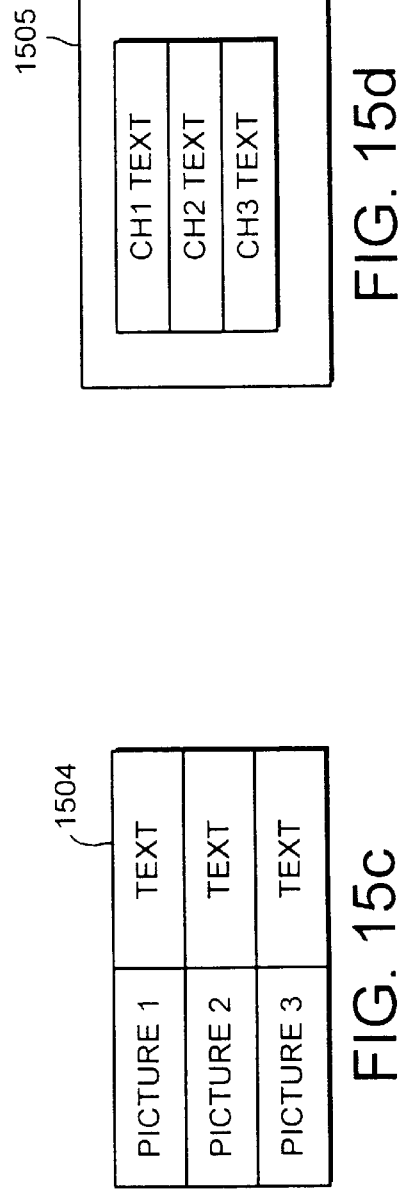

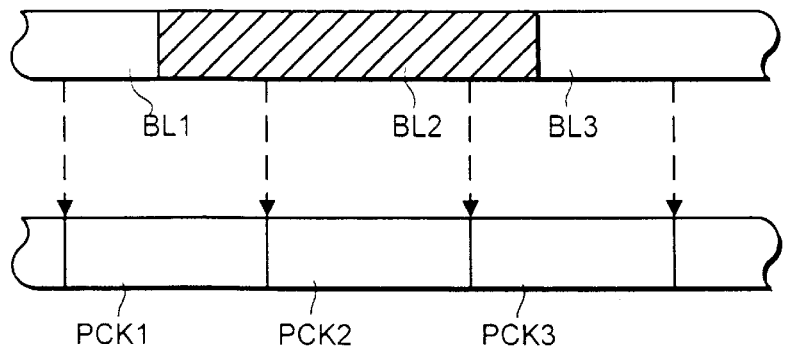

FIG. 20

| Syntax | Num. of Bytes |
|---|---|
| 1  Downloadinfoindication () { | |
| 2  dsmccMessageHeader () | |
| 3  downloadId | 4 |
| 4  blockSize | 2 |
| 5  windowSize | 1 |
| 6  ackPeriod | 1 |
| 7  tCDownloadWindow | 4 |
| 8  tCDownloadScenario | 4 |
| 9  compatibilityDescriptor () | |
| 10  numberOfModules | 2 |
| 11  for(i=0;i< numberOfModules; i++) { | |
| 12    moduleId | 2 |
| 13    moduleSize | 4 |
| 14    moduleVersion | 1 |
| 15    moduleInfoLength | 1 |
| 16    for(I=0;i< moduleinfoLength; i++) { | |
| 17    moduleInfoByte       } | 1 |
| 18  } | |
| 19  privateDataLength | 2 |
| 20  for(i=0; i<privateDataLength; i++) { | |
| 21    privateDataByte     } | 1 |
|   } | |

FIG. 23

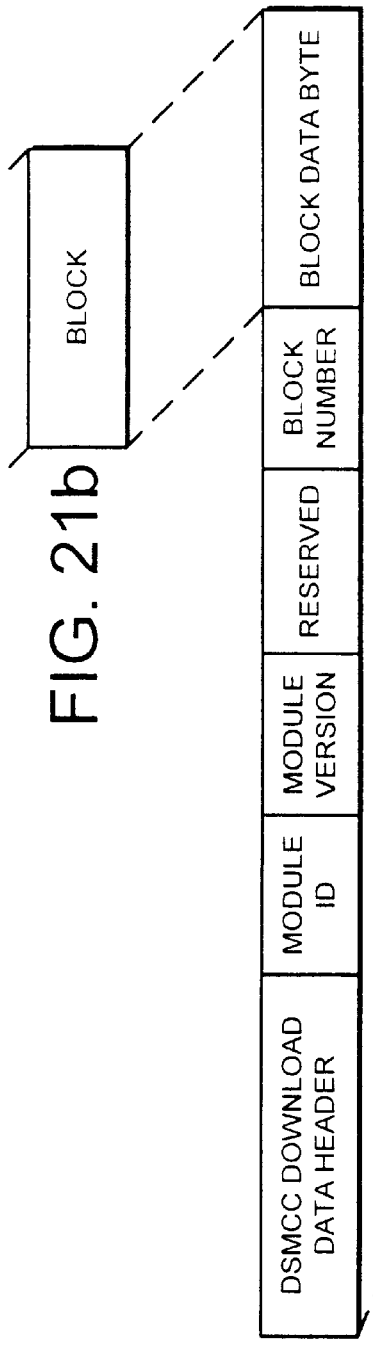
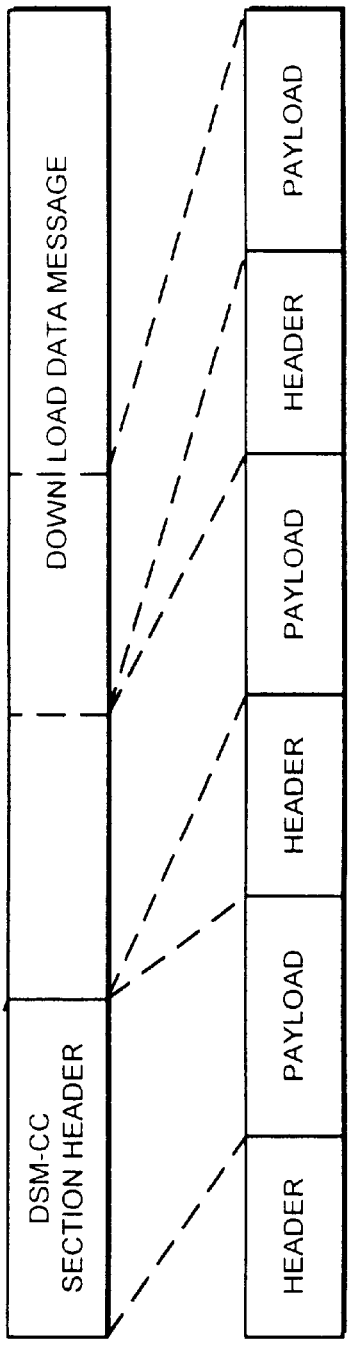
FIG. 21a  FIG. 21b  FIG. 21c  FIG. 21d  FIG. 21e

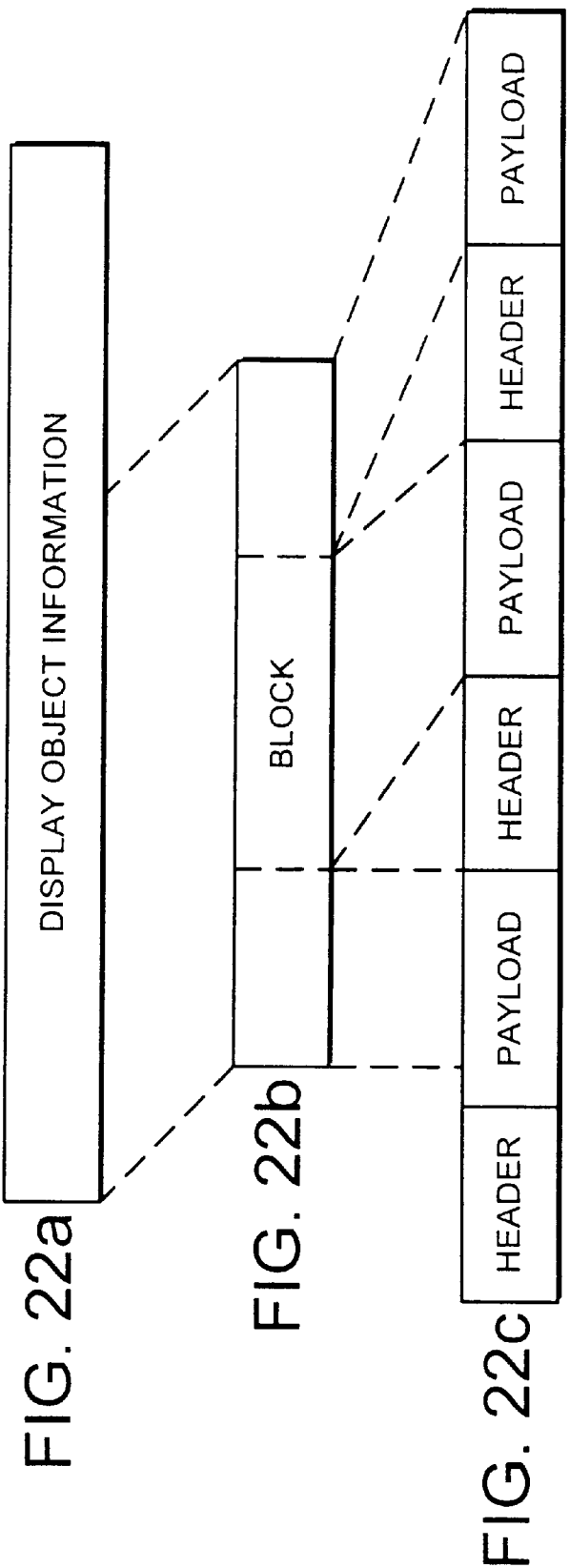

INTELLIGENT DIGITAL TELEVISION RECEIVER

FIELD OF THE INVENTION

The present invention relates to a television receiver for receiving the broadcast wave to process the data contained in the broadcast wave and the picture signal for display, and provide the additional information to the viewer, and more particularly to a so-called two-way television receiver which is having the response function.

BACKGROUND OF THE INVENTION

Recently, according to the progress of the semiconductor technique and the communication technique the television receiver having higher function have been developed. Especially, compared with the conventional passive TV to just enjoy viewing the picture or audio signal, the television receiver having the higher function that it adds more than the picture and the audio information by multiplexing the digital data by using the digital technique, or it can response to the TV program becomes to be desired.

As the TV which realize such functions mentioned above, there is a Compact Graphical Interactive Broadcast Information System mentioned on the International Application Published under the patent cooperation treaty (PCT) International Patent Class: H04N1/00, International Publication Number: WO96/3466. This document 1 shows the ways to realize the two-way function by multiplexing not only the normal image data but the new data to the TV program. Further, this document shows the way to realize the two-way function by multiplexing the data on the vertical retrace interval which is called VBI (Vertical Blanking Interval).

FIG. 28 shows the construction of the transmission side and the receiving side mentioned on the document.

An image signal input from an input terminal on the transmission side is supplied to an inserting device 3 by an NTSC encoder 2. On the other hand, data for giving a new service are input from an input terminal 6, and the data are encoded in a data encoder 7, then supplied to the inserting device 3. To the data encoder 7 a timing signal is supplied from an information update device 8. The audio signal is omitted to simplify this explanation, however, it is also encoded in the same way as the video signal. In the inserting device 3 one signal is formed by the inserting of the data. The signal is modulated by input in a modulator 4, then output from an output terminal 5.

On the other hand, on the receiving side, the signal output from the transmitter is received in an input terminal 20, then demodulated in a demodulator 21. The demodulated signal is input to an extractor 22, where the data are extracted. And, the output signal of the demodulator 21 is decoded by input in an NTSC decoder 23. The extracted data are taken in a memory 30 via a bus 27 which is connected to a CPU 26 so as to be processed by the software which is driven by the CPU 26. To the bus 27 an image memory 33 is connected, where the result of the data decoding is displayed as the image. And to the bus 27 a photoreceptor 31 for receiving the output signal of a remote controller 32, so as to transmit the response of the user and change the processing of the software.

To the bus 27 a transmission and receiving device, so called a modem 29 is connected, where the response of the user is sent back to the server via a terminal 28. In the modem 29 it is also possible to receive the data from the server by the network.

The output signals from the NTSC decoder 23 and the image memory 33 are synthesized by input to a synthesizing device 24, then output from an output terminal 25. Accordingly, the graphical application constructed by the data which are multiplexed with the video signal is synthesized, so that it is possible to receive and display the TV program which sends the complement information or the response of the program back.

Further this DRAWING shows the construction of the server. The signal output from the terminal 28 on the receiving side is input to a terminal 11, then input to a server 9 via a modem 10. Here, the server is not only for receiving the signal from the receiving side but for transmitting the data to the receiver. In case of outputting the data from the server 9, the data are output from the terminal 11 via the modem 10, then received in the terminal 28 on the receiving side. Accordingly, the data are flowed in two-way between the terminal 11 and the terminal 28.

FIG. 29A shows the construction of the screen constructed by the devices mentioned above. On the display screen the graphic image which is made by decoding the data is displayed with the video signal. On the document mentioned above the section where one picture is displayed by forming one picture and decoding the data is referred as the object. Further, the actual image or text which are displayed as the object is referred as the resources, and the document which mentions the operations of the object or form is referred as the script.

Further, the consecutive program which is constructed by these forms is referred as the application.

FIG. 29B shows the relation of the elements constructing these applications. The whole applications are defined a specific form called the application form. The application form shows the numbers or construction of the whole forms, objects, resources, and scripts which are used for the application. The application form prescribes which form is used next. In each form an object construction one form is defined. In the object the resources and the pointer of the script showing the content of the object are shown. One application is constructed by the constructions mentioned above.

Further, the document mentioned above shows that the transmission is executed by storing each element in the record when these elements are transmitted.

FIG. 30 shows the stratum constructions of the record and the application. The information of the application form defining the whole application is transmitted by an application header record 41, where the information showing the script and form which is carried out first in the application is stored. The information of the form is stored in a form record 42, where the numbers showing the object and the resources used for the object and the position information showing the script are contained.

All scripts are collected into one and transmitted by a script record 43. In case of the resources, the resources are transmitted by resource records 44 and 45, respectively.

These records are divided into the transmission units called blocks, then these are transmitted after the headers of the blocks are added to them. As mentioned above, the application in the document are constructed by many constructing elements. The graphical elements shown in the picture which construction is set up by the form are shown as the object. In this case, for instance, the operation that the user changes the content of the text by pushing the button is mentioned as the script.

As described above, in the two-way television system shown in the document, one application is divided into several construction elements and transmitted so that the data are easily multiplexed, and the interactive application is realized by the operation of the script. However there are drawbacks when this system is applied to the digital broadcast receiver:

(A) In the digital broadcast the video signal is decoded by the exact timing. However, the digital broadcast does not have a synchronizing function by decoding the graphical elements of the application and the digital image signal. Accordingly, the timing control style to display by executing the application related with the video signal which is constructing the TV program is not defined exactly. In the conventional embodiment since there is no relationship between the video signal and the data to be multiplexed, the display timings of the video signal and the decoded data are not defined.

Further, in the conventional embodiment, since the operation of the application is decided by the script it is necessary to make the script when the application is made. The conventional embodiment does not provide the effective function to use the stream in the digital broadcast and to provide the application which does not always need the script.

(B) In the digital broadcast, since the capacity of the transmission protocol will be expanded, it is considered that the function is updated by the download function on the receiving side. On the other hand, in the conventional embodiment, the text or the bitmap data are defined as the resources, however, since these decoding function is fixed there is no flexibility. That is, there is no countermeasure to correspond to the compression algorithm of the bitmap image having better compression efficiency for the future.

Further, there is no consideration for the adding function of the application program to add the specific function.

(C) Usually, the TV receiver has a function for parameter set up of the receiver of protocol display called OSD (On Screeed Display). The digital broadcast needs the EPG (Electric Program Guide) to select an appropriate protocol by the user since the number of the protocols will be expanded in accordance with an increase of protocols. Accordingly, having these two-function separately in the TV receiver increases the cost of the TV receiver. Further, the effective way to use the EPG function is not provided in the conventional embodiment.

(D) In the digital broadcast the video, audio, and data are transmitted by the transport stream prescribed by ISO/IEC 13818-1 (document 2) called the MEPG 2 systems. This prescription shows the way to execute the function on the receiving side by several information which are defined in the stream, however, since the transmission way shown in the conventional embodiment has no relation with the transport stream it does not use the information prescribed in the stream effectively.

(E) In the conventional embodiment, the data are received by a so-called carousel system which transmits the data repeatedly. In the digital broadcast the data are also transmitted repeatedly by the data carousel system of the DSM-cc prescribed in the ISO/IDC 13818-6 (document 3), so that the conventional embodiment does not use the information defined in the stream to execute the data carousel system in the digital broadcast effectively.

(F) In the digital broadcast the image format is not only one, but many horizontal and vertical resolutions are defined. Through he image compressing form is prescribed in the ISO/IEC 13818-2, the image formats are different by the profiles or levels. In the conventional embodiment the synthesizing display of the image is shown, however, there is no way to correspond to the different image format flexibly. The position of the coordinates of the object is changeable by the display processing, and the compressing expansion processing of the bitmap image can be executed by inserting repeatedly or thin, down the pixel. However, this way of compressing expansion of the image causes the remarkable image deterioration.

SUMMARY OF THE INVENTION

It is, therefore, an object of the present invention is to provide a digital broadcast TV receiver which can solve the drawbacks mentioned above.

Another object of the present invention is to provide an intelligent digital television receiver that receives the data multiplexed with the video or audio transmitted on the digital broadcast, and executes the new service by these video, audio or data.

In order to achieve the above object, an intelligent digital television receiver according to one aspect of the present invention for receiving a video signal, an audio signal and a digital data transmitted in a digital broadcast, and executes an application either executing together with a video or audio or executing independently, has a controller for controlling executions of applications by generating events according to event start information bearing time information contained in a digital data stream as an object which comprises an element of the application and another controller for controlling executions of the application.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a diagram showing the construction of the multiplexed data;

FIG. 11 is a diagram for explaining the data processing of the hardware resource decoder in the fifth embodiment;

FIG. 13 is a diagram for explaining the data processing of the hardware resource decoder in the sixth embodiment;

FIG. 15 is a diagram for explaining the EPG application in the seventh embodiment;

FIG. 20 is a diagram for explaining the conversion of the prior information;

FIG. 21 is a diagram showing the conversion of the prior information, and the data construction conversion of the first transmission protocol;

FIG. 22 is a diagram showing the conversion of the prior information, and the data construction conversion of the second transmission protocol;

FIG. 23 is a diagram showing the format defining the data download;

DESCRIPTION OF THE PREFERRED EMBODIMENTS

The present invention will be described in detail with reference to the FIGS. 1 through 27.

Figure 1A:
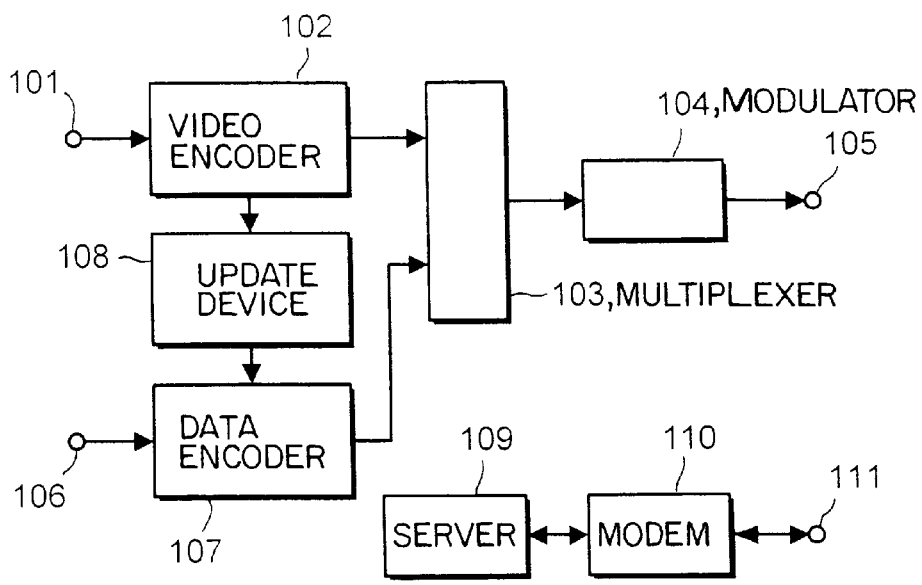
FIG. 1 is a diagram showing the system construction related to the present invention.
Figure 1B:
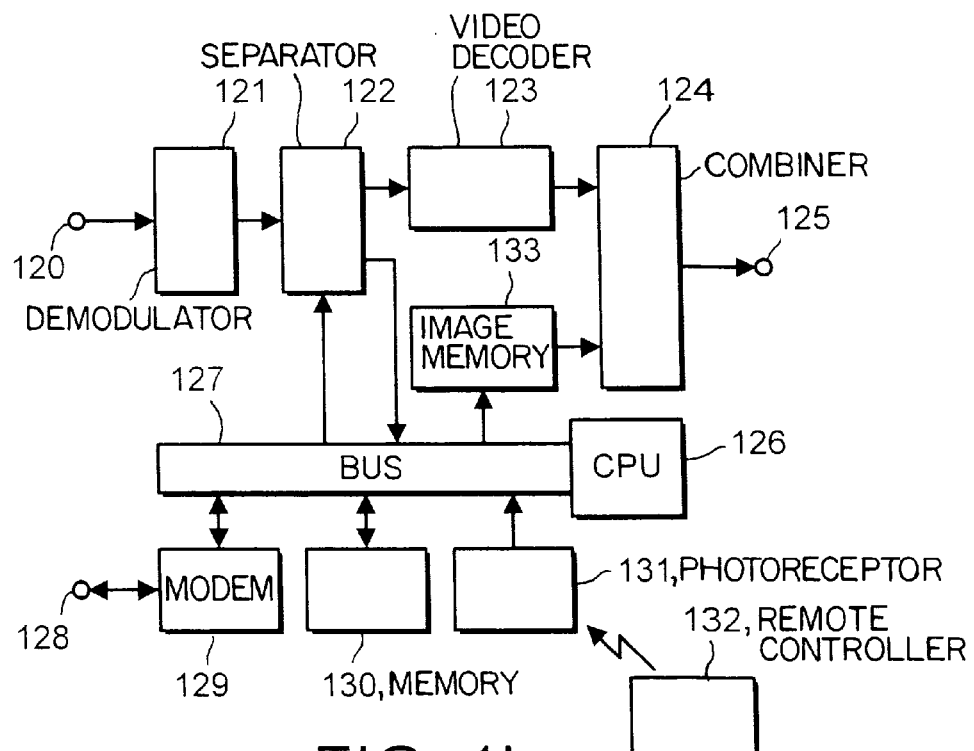

FIG. 1A shows the construction of the transmission side, and FIG. 1B shows the construction of the receiving side. A video signal input from an input terminal 101 is encoded in a video encoder 102, then it is supplied to a multiplexer 103, where data for executing a new service input from an input terminal 106, and encoded in a data encoder 107 are supplied to. The audio signal is not explained here to simplify the explanation, however, it is multiplexed in the multiplexer 103 in the same way as the video, then one signal is formed in the multiplexer 103. The output signal is modulated in a modulator 104, and output from an output terminal 105.

An information update device 108 updates the resources which are the application elements one after another. The resources output from the information update device 108 are supplied to the data encoder 107 to update the resources.

On the other hand, on the receiving side the signal output from the transmitter is received in an input terminal 120, then the received signal is demodulated in a demodulator 121. The demodulated signal is input to a separator 122, where the video signal is separated from the data. The video signal is decoded in a video decoder 123. The separator 122 is controlled by the data generated in a CPU 126. The data separated from the video signal are taken in a memory 130 via a bus 127 connected to the CPU 126, so that the data processing is executed by the software driven by the CPU 126. To the bus 127 an image memory 133 is connected, which is used for displaying the result of the data decoding as the image. And to the bus 127 a photoreceptor 131 for receiving the output signal from a remote controller 132 is connected, so as to transmit the response of the user to the CPU 126 and change the processing of the software. Further, to the bus 127 a modem 129 is connected.

This is for sending the response of the user back to the server via a terminal 128. The modem 129 is also possible to receive the data from the server via a network.

The output signals from the video decoder 123 and the image memory 133 are input to a combiner 124, where the images are synchronized. The synchronized signal is output from an output terminal 125. Accordingly, it is possible to synchronize the graphical application which is constructed by the data multiplexed with the video signal, so as to receive and display the TB program which can send the complementary information of the program or response back.

Furthermore, FIG. 1A shows the construction of the server. The signal output from the terminal 128 on the receiving side is input to a terminal 111, then it is input to a server 109 via a modem 110. Here, the server is not only receive the signal from the receiving side but send the data to the receiver. In case of output the data from the server 109 the data are output from the terminal 111 via the modem 110, then these are received in the terminal 128 on the receiver side. Accordingly, the data flows in two-way between the terminal 111 and the terminal 128.

Figure 2:
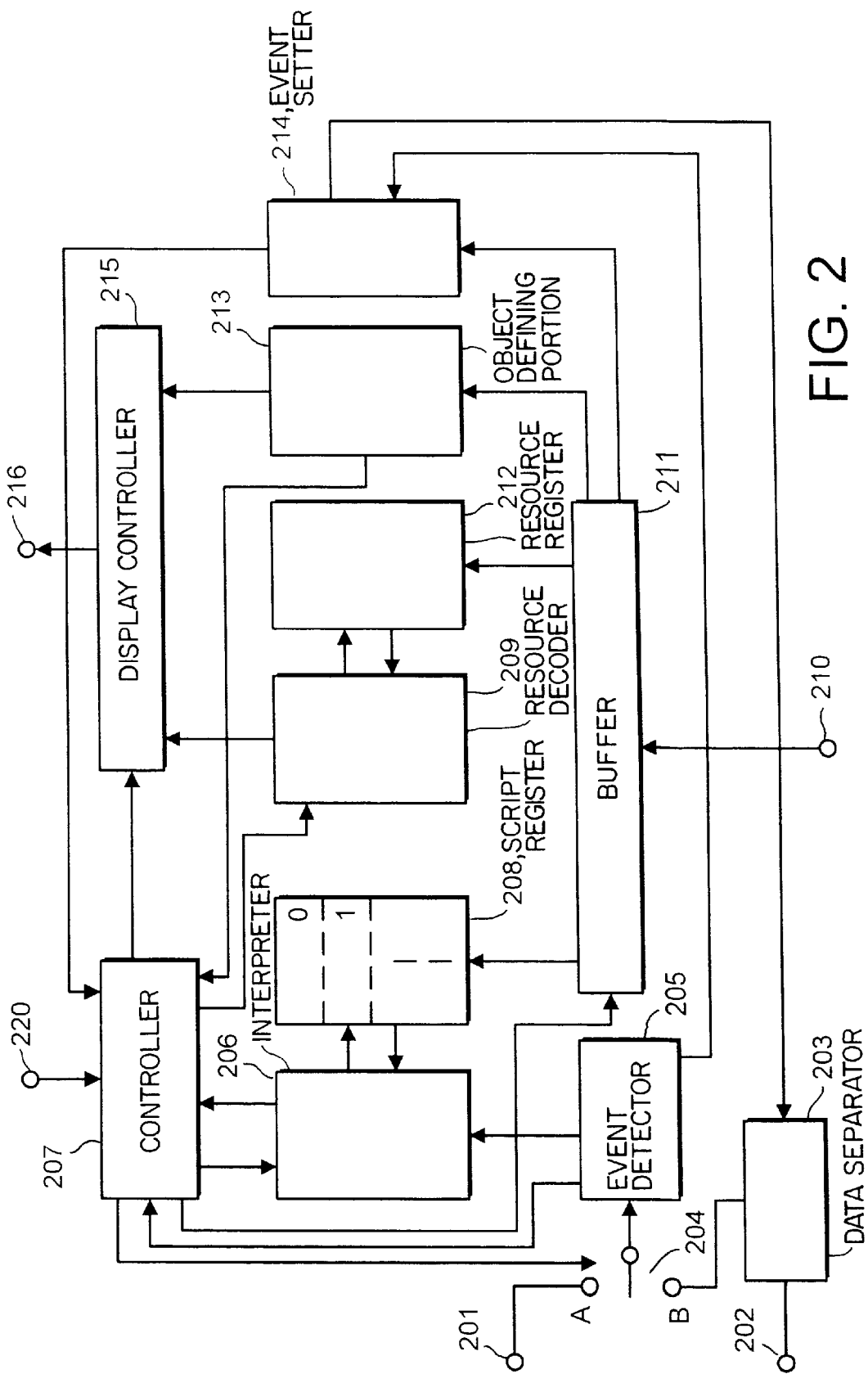
FIG. 2 is a diagram showing the first embodiment of the application decoder.

FIG. 2 shows the main parts of the first embodiment according to the present invention.

FIG. 2 shows the construction of the application decoder. The application decoder is operted by the software executed by the CPU 126 and the memory 130 shown in FIG. 1B.

An event such as "the button is pushed, or the timer passes 2 seconds" is input from an input terminal 201. Concretely, the event is the data which is output from the remote controller 132 is received in the photoreceptor 131 or which are output from the timer inside of the CPU 126. In the conventional embodiment, the event executes the script, so as to carry out the interactive operation. Accordingly, when a switch 204 is changed to the terminal A it executes the same operations as the conventional embodiment, so that it maintains the compatibility.

First, the compatible operations with the application in the conventional embodiment will be explained.

The application elements are input from an input terminal 210. From the input data a buffer 211 stores the script to a script register 201, the resources to a resource register 212, and the object to an object defining portion 213. Accordingly, the preparation for displaying the application is over.

An interpreter 206 interprets the stored script and outputs the control signal which controls the operation to a controller 207. The controller 207 outputs the control signal which start the display to a resource decoder 209 by the input control signal.

The resource decoder 209 decodes the resources stored in the resource register 212 and outputs the image or text to a display controller 215.

The image data processing in the display controller 215 are output to an output terminal 216.

Here, the output terminal 216 is the input portion to the image memory 133 as the hardware in the FIG. 1B. And, the input terminal 210 is the input portion of the data output from the separator 122.

According to the operation described above, it is able to display and execute the application mentioned in the conventional embodiment.

On the other hand, the controller 207 changes the switch 204 to a terminal B by the control signal output from an event setter 214. In this case the application is executed by the following operations.

(1) The data which is separated from the transport stream are input from an input terminal 202. From the input data, for instance the time information is taken out in a data separator 203. The data separator 203 executes the separating operations in the condition which has been decided beforehand in the event setter 214.

(2) The data taken out of the data separator 203 are output to an event detector 205, where a specific control signal is generated. Then the signal is output to the controller 207.

(3) The controller 207 inputs the event data output from the event detector 205 to the event setter 214, and it takes the control information which has been set up beforehand in from the event setter 214.

(4) The controller 207 controls the display controller 215 according to the information of the object defining portion 213, so that the preparation of the display is over.

(5) Further, the controller 207 outputs the control signal to the resource decoder 209, which decodes the resources stored in the resource register 212, so as to execute the display control.

As mentioned above, it is able to start the application display directly by the time information for instance contained in the data of the digital broadcast.

FIG. 3 shows the data construction multiplexed in the digital data broadcast in the stratum.

Application elements 301 such as the forms, the objects, the resources or the scripts are stored in their corresponding records 302. One of the records is encoded over several blocks 303 (FIG. 3 exemplarily shows one block to which the block header is added). The block 303 is divided more to accord to the transmission standard and converted into the transport stream TS in 188 bytes length to be multiplexed.

To the transport stream TS the data such as the video or audio are also multiplexed, where the time information is stored.

Figure 4A:
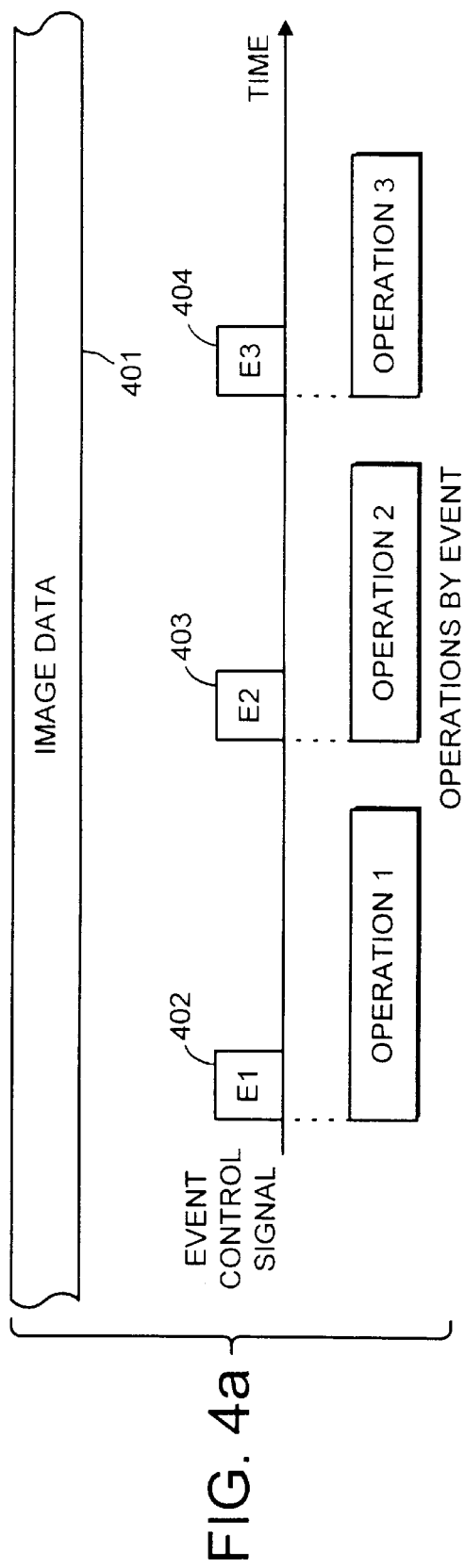
FIG. 4 is a diagram for explaining the operation executed by the event.

FIG. 4 shows the operation of the first embodiment according to the present invention.

The multiplexed data shown in FIG. 3 are decoded in a form of a video data 401 which is continuously reproduced as an image. The stored time information is transmitted at specific timings shown as 402, 403, and 404. Accordingly, to process the time information as the event the application is executed at the timing synchronized with the video signal shown as the operation 1, operation 2, and operation 3.

In the first embodiment according to the present invention, the application operation is started by the time information as the event. However, since it is able to multiplex other data to the transport stream TS, the application is able to be executed by the information besides the time information as the event or event starting information in changed condition of the event setter 214 shown in FIG. 2.

Figure 4B:
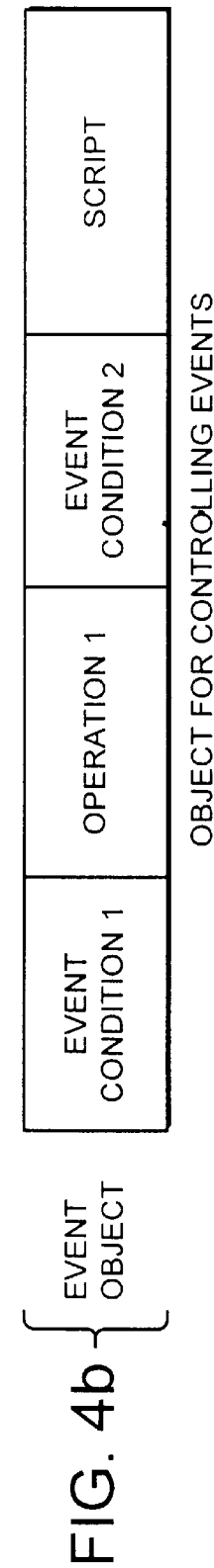

In this case, since it is desired that the condition is set up from the transmission side, the event control object shown in FIG. 4B is defined and transmitted. Since the object is defined as the conventional application elements the transmission system does not need to be changed.

Figure 5:
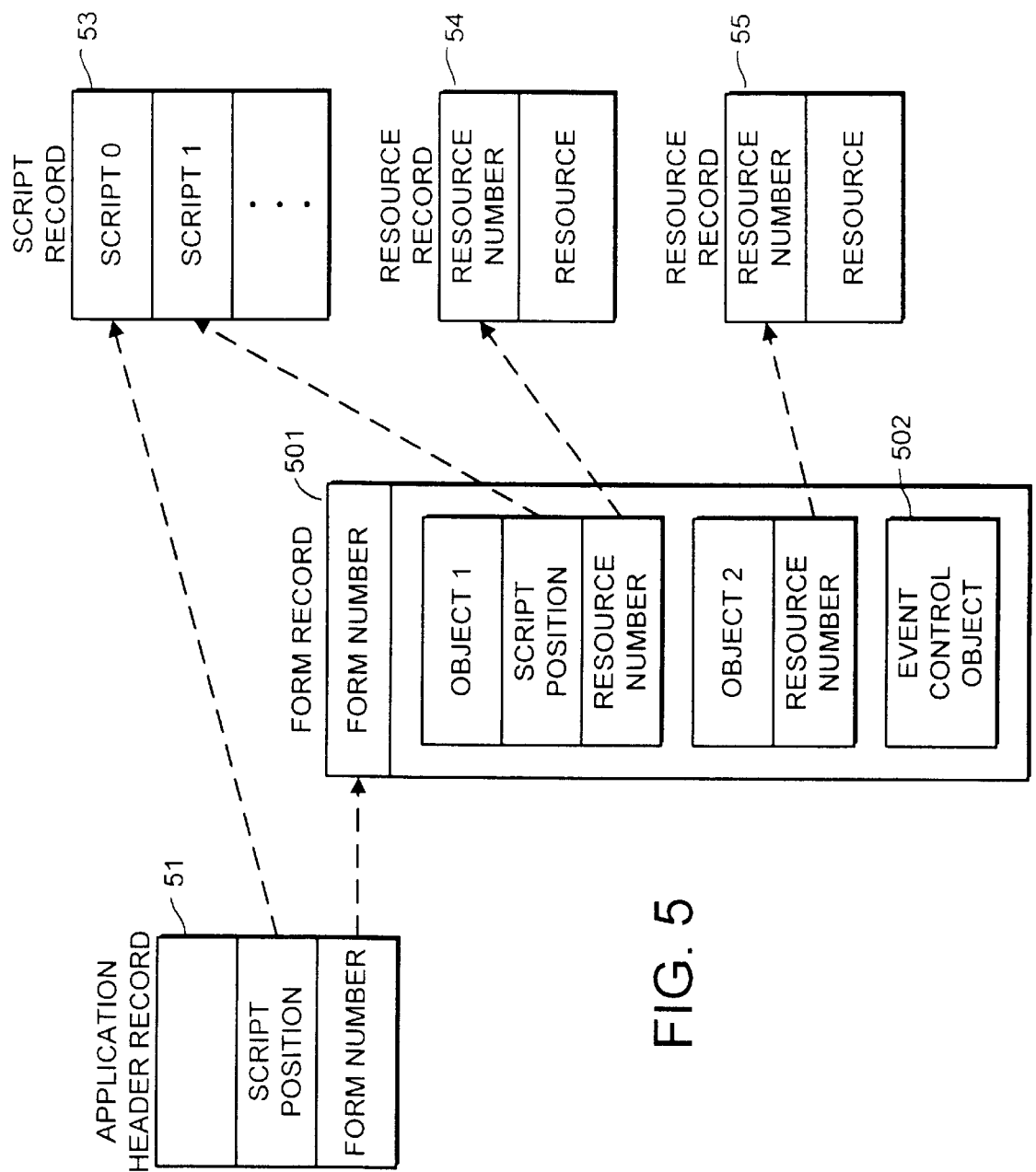
FIG. 5 is a diagram showing the stratum construction of the application.

As shown in FIG. 5, an event control object 502 is stored in a form record 501, so as to transmit without changing the construction.

FIG. 4B shows the operation when the specific event is received. FIG. 4B also shows the script executed by the specific event. When the object shown in FIG. 4B the application decoder shown in FIG. 2 executes the application by the event stored in the event setter 214 not in the object defining portion 213.

According to the operations described above, it does not need to make the script so as to lighten the burden imposed on the application producer, in addition, since it does not execute the script on the receiver side it shortens the operation time of the interpreter 206.

If it is not the application for defining the complex operation, it has the advantage explained above, in addition, it is able to execute the application related to the video signal since its synchronization is defined with the video signal. Further, since the event condition is set up on the transmission side not on the user side, it is also possible to display the information one after another.

FIG. 6 shows the second embodiment which is expanded from the first embodiment.

The second embodiment changes only the resources by the time information as the event. In this embodiment, the bitmap image defined as the resources is synchronized with the video and displayed. However, it is obvious that the other text or still image can be applied same way.

Figure 6A:
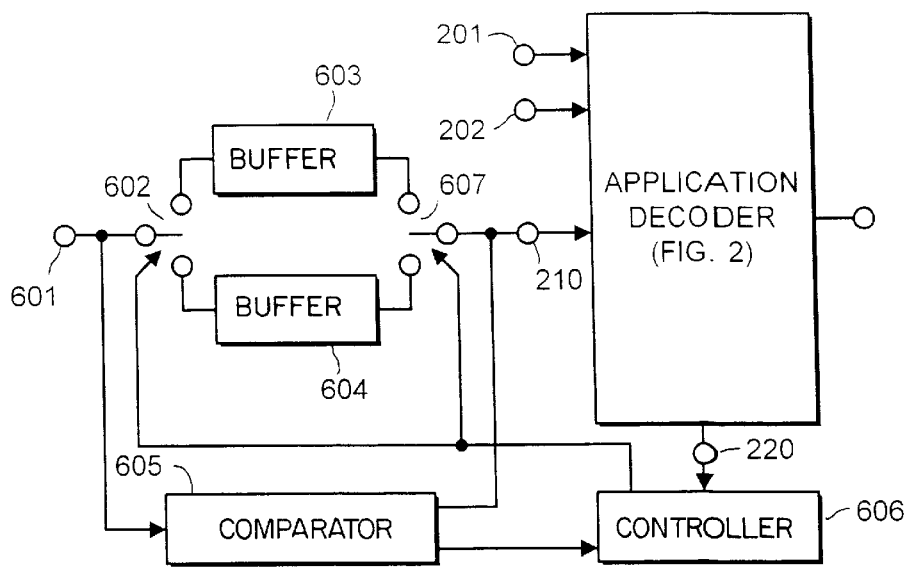
FIG. 6 is a diagram showing the continuous resource update in the second embodiment.

The resource data input from an input terminal 601 are input to the application decoder as shown in FIG. 6a one after another from switches 602, 607, and buffers 603, 604. Here a version comparator 605 checks that the resource version is updated and rewrites the old resources. The information which version is checked is input to a controller 606. The controller 606 controls the switches 602, 607 to control the writing in and reading out mutually by the buffers 603, 604. The output signal output from either of the buffers 603, 604 is input to the input terminal 210 of the application decoder via the switch 607. The control signal (for instance the time information) from the application decoder is input to the controller 607 from an output terminal 220. The control signal controls the timing to change the buffers based on the time information of the application decoder.

The operations explained above will be explained in reference to the FIG. 6C. Th data of the buffers A and B are read out for periods 620, 621 and 622 in synchronous with clock pulses 610, 611, 612 and 613. According to update the data one after another it is possible to produce the animation by synchronizing the graphic image such as the bitmap with the video signal. Further, if the timing of the buffer is changed by adjusted to the CPU efficiency it is possible to produce the animation having a lower flame rate. For instance, it is possible to change the object in the sub picture so as to show it animated.

Figure 6B:
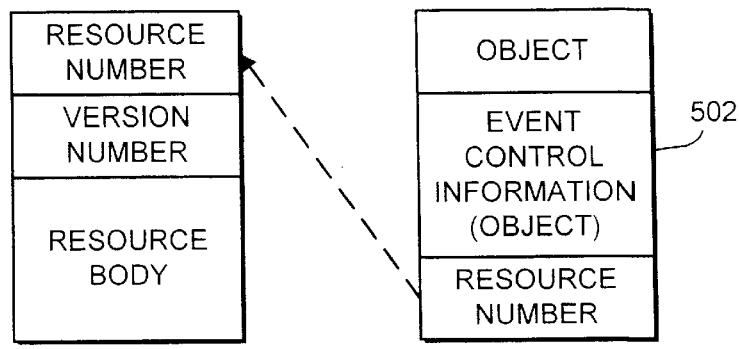
Figure 6C:
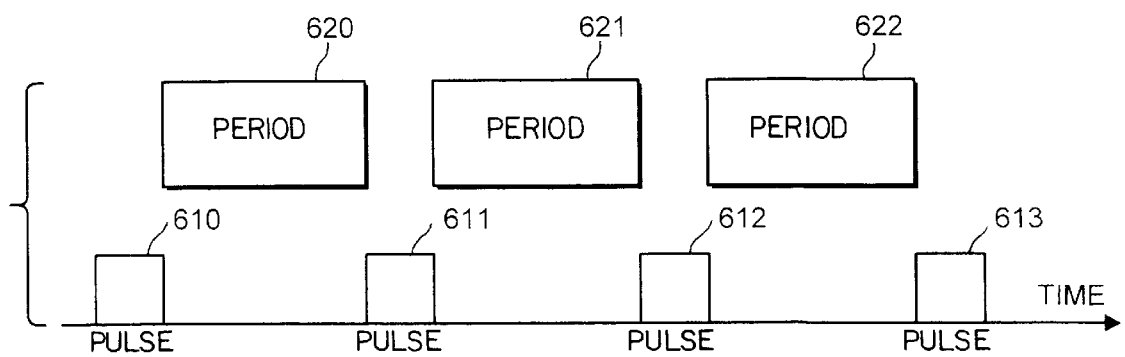

This object as shown in FIG. 6B, is easily transmittable by the object having the event condition based on the time information and resource number.

The resources themselves are manageable by the resource number and the version number.

Figure 7:
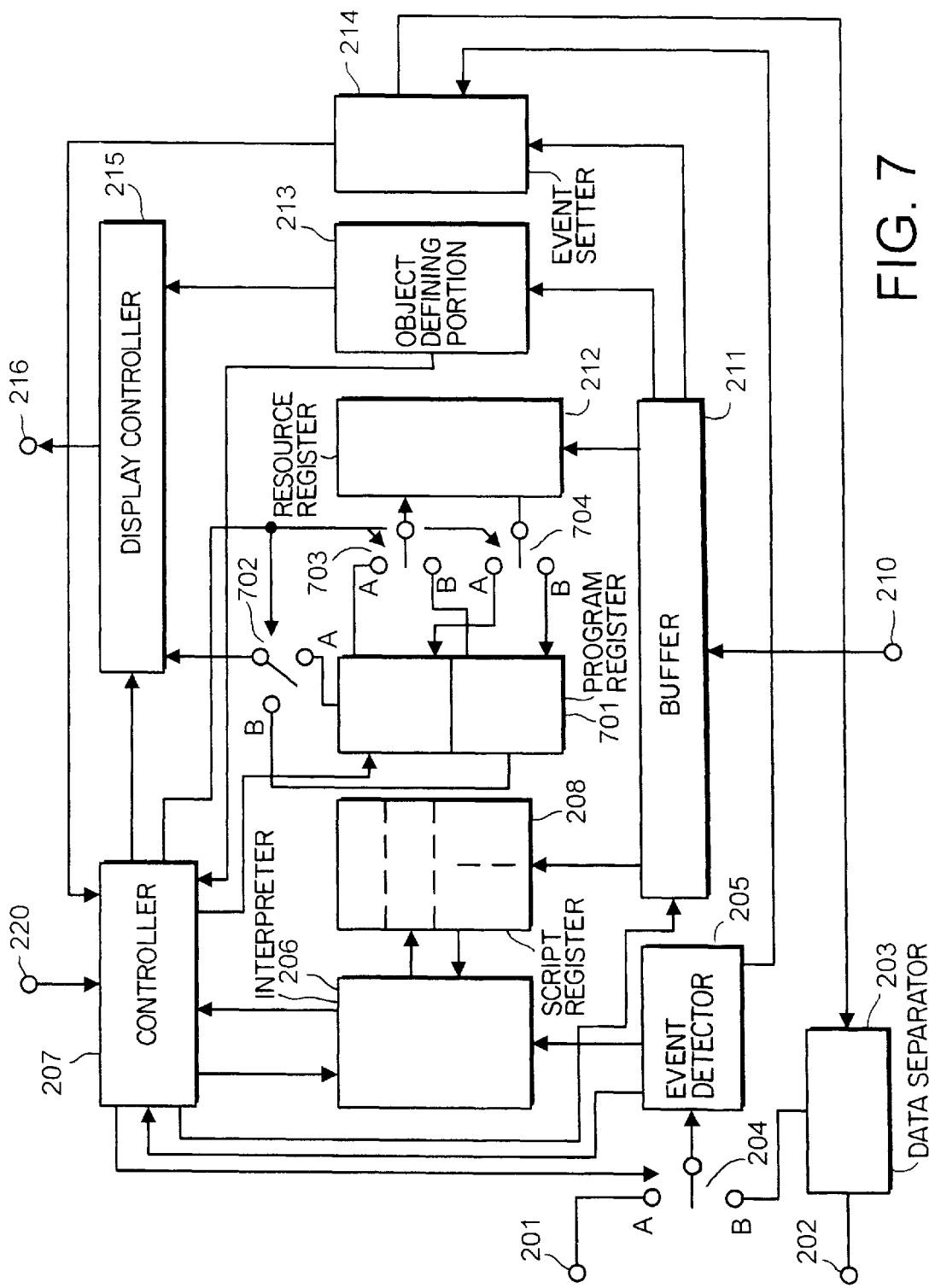
FIG. 7 is a diagram showing the construction of the application decoder in the third embodiment.

FIG. 7 shows the third embodiment.

The third embodiment has a feature that it is able to freely change the decoding of the resources. The third embodiment differs from the second embodiment by that it includes three switches 702, 703, and 704 and a resource decoder 701 divided into a decoding program register and a decoder.

In the embodiment the following operations are executed.

The application elements are input from the input terminal 210. From the input data, the buffer 211 stores the script to the script register 208, the resources to the resource register 212, and the object to the object defining portion 213.

Next, according to the control signal output from the object defining portion 213, the resource decoder execution program for decoding the resources is stored in a decoder program register 701. So that, the preparation of the application display is over.

According to the control information of the object defining portion 213, it judges whether the resources are decoded by the execution program which the resource decoding is down loaded in the controller 207 or by the build-in decoder, so as to control the switch 702, 703, and 704. In case of using the down loaded decoder it changes the switch to the terminal B. The resources themselves can be decoded in several kinds of programs.

Figure 8:
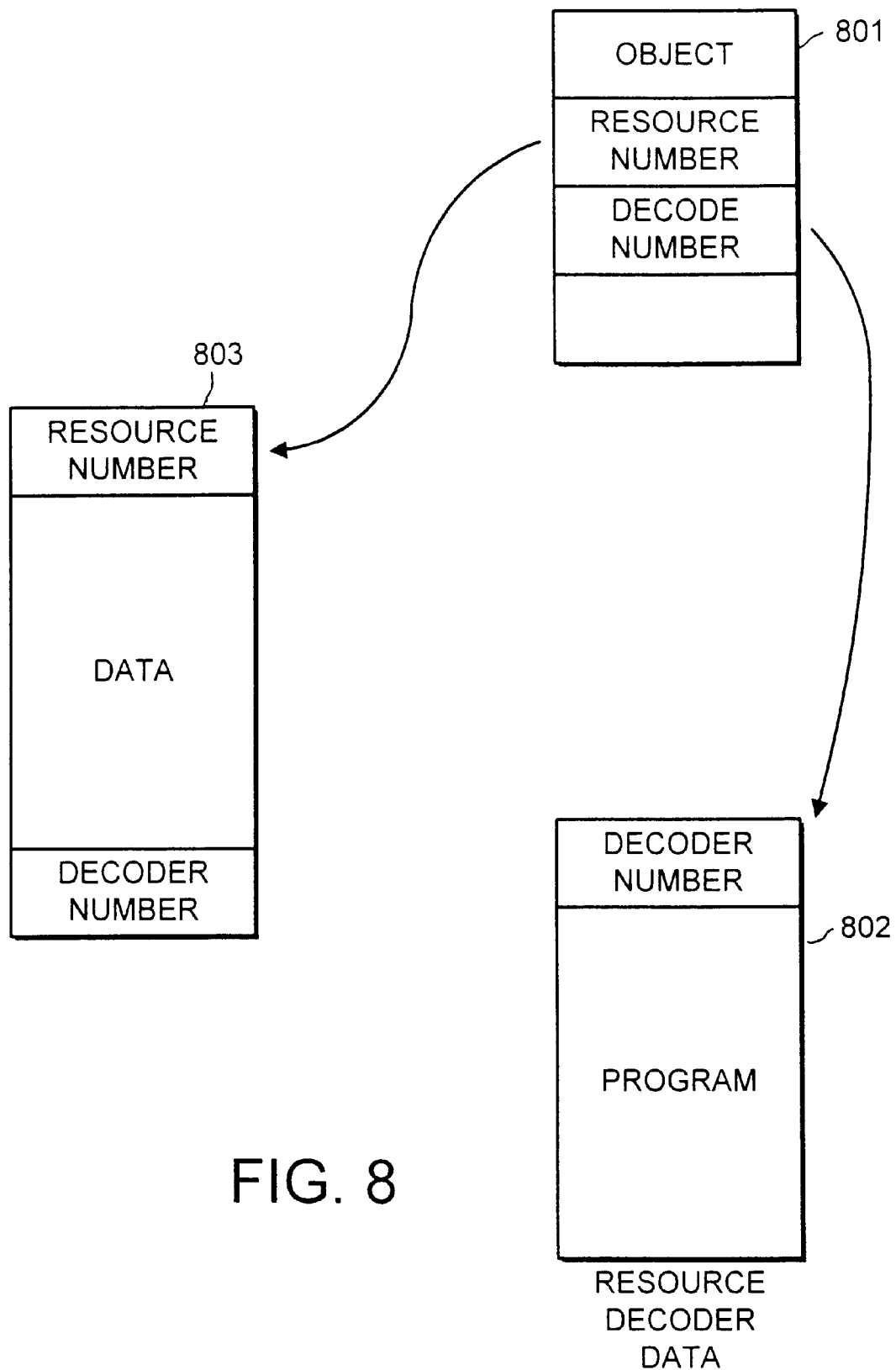
FIG. 8 is a diagram showing the data construction of the resource decoder.

FIG. 8 is explaining the down load data of the resource decoder related to the third embodiment.

The resource numbers stored in an object 801, and the decoder numbers showing the record which is storing the execution program for decoding the resources are stored in the object defining portion 213. In referring to the object 801, its corresponding resource 803 and record 802 where the resource decoder execution program is stored are taken in the decoder and decoder program portions at the same time, so as to start the operations mentioned above.

Figure 9:
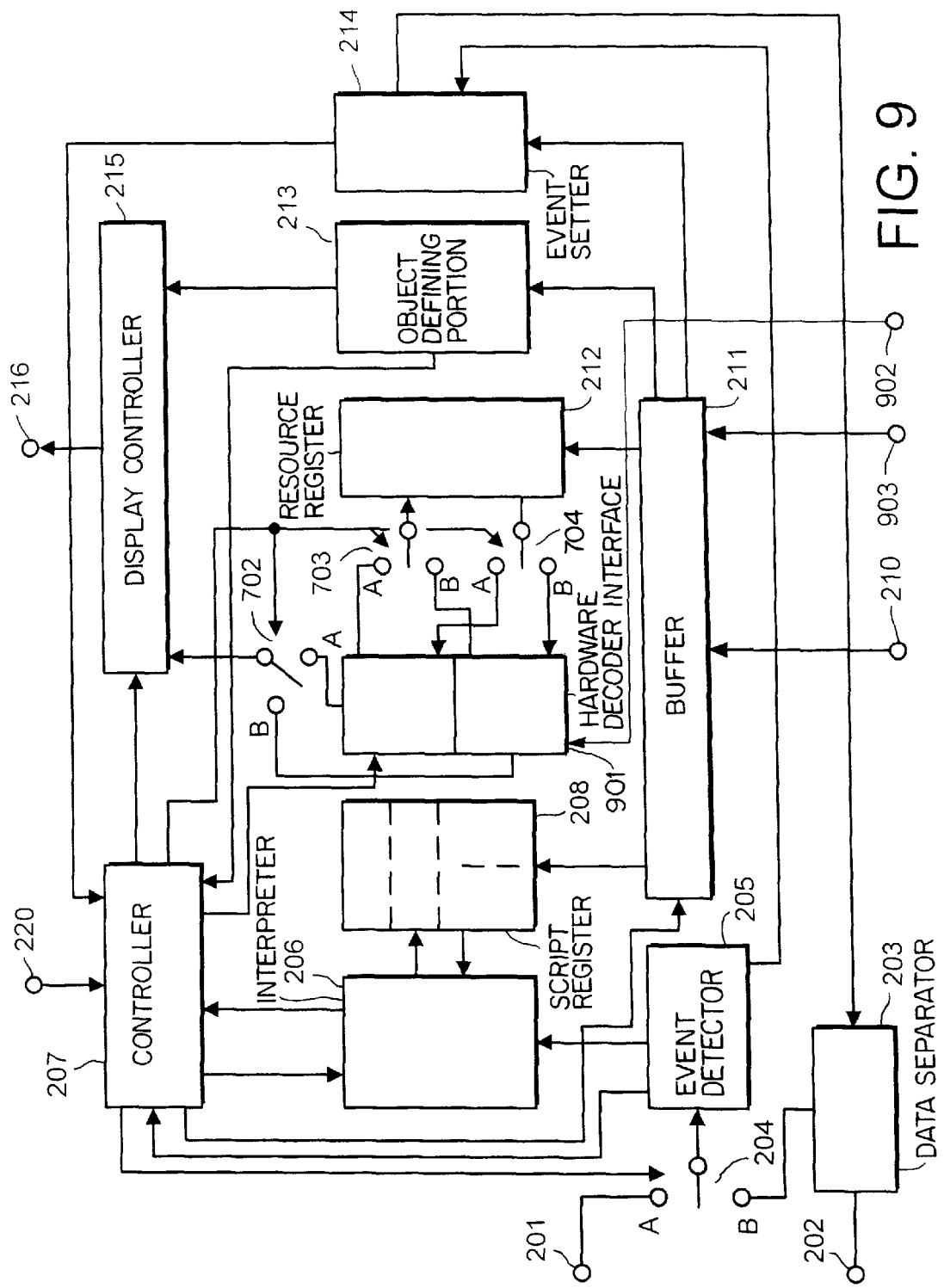
FIG. 9 is a diagram showing the construction of the application decoder in the fourth embodiment.

FIG. 9 shows the fourth embodiment. The difference from the third embodiment is that it uses a hardware decoder interface 901 as substitute for the resource decoder execution program. The hardware decoder interface 901 can output the control signal from an output terminal 902 in case of need. The other difference from the third embodiment is that the external terminal 903 is added to. Since other elements are same as the third embodiment, these are assigned with the same marks.

In the fourth embodiment the following operations are executed.

The application elements are input from the input terminal 210. From the input data the buffer 211 stores the script to the script register 208, the resources to the resource register 212, and the object to the object defining portion 213.

Next, according to the control signal output from the object defining portion 213, it decides to use whether the external hardware or the internal decoder as the resource decoder for decoding the resources. In case of using the internal decoder, it executes the same operations as the first embodiment.

In case of using the external decoder, the control signal to the external hardware in a hardware decoder interface 901 is output from an output terminal 902.

The resources decoded by the external hardware are received in an input terminal 903 and stored in the resource register 212 via the buffer 211. The stored resources are output via the switch 704 and the hardware decoder interface 901.

The controller 207 controls the switches 702, 703 and 704 based on the control information of the object defining portion 213 at the display timing. In case of using the hardware decoder the switch is changed to the terminal B.

Figure 10:
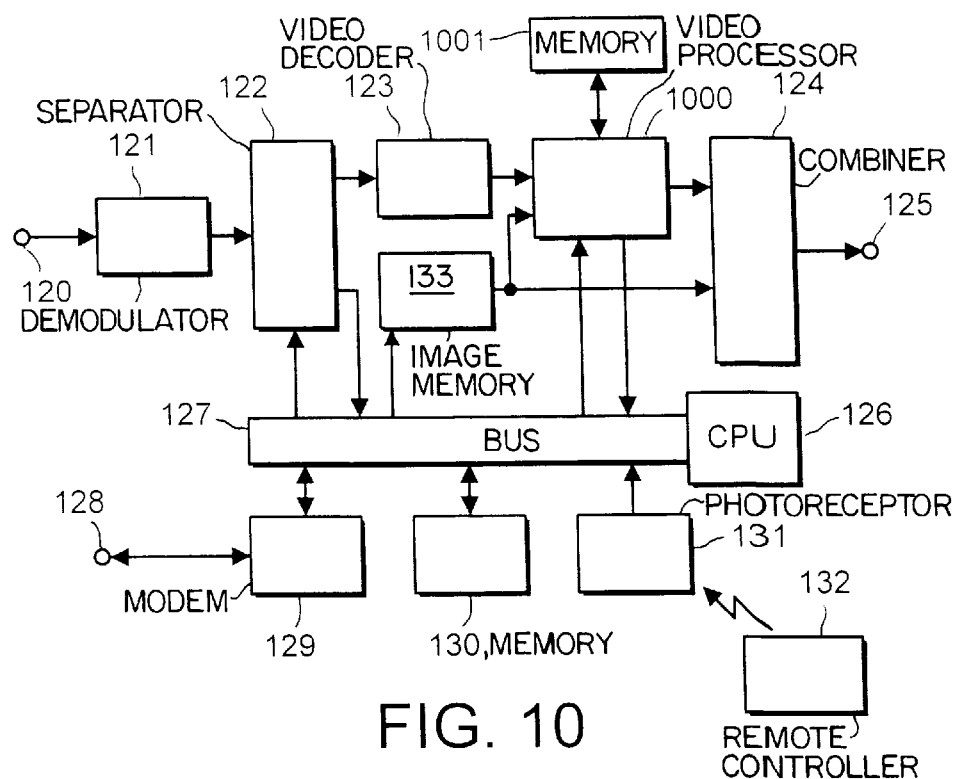
FIG. 10 is a diagram showing the construction of the hardware resource decoder in the fifth embodiment.

FIG. 10 shows the construction of the hardware shown in fourth embodiment.

In FIG. 10, a video processor 1000 and a memory 1001 are added after the video decoder 123 to the construction of the receiver shown in FIG. 1B. When the image output form the video decoder 123 is input to the video processor 1000, the video processor 1000 executes a specific processing according to the control signal output from the CPU 126. Here, the output signal input to the video processor 1000 is the signal output from the terminal 902, as shown in FIG. 9. However, since the application decoder shown in FIGURE is constructed by the software, the control signal is output to the video processor 1000 as the signal output from the CPU 126. The picture processor 1000 holds the video one by using the memory 1001, then it transfers the image data to the image memory 133 via the bus 127 based on the CPU 126. The image data are same as the decoded resources which are input to a terminal 903 in FIG. 9. The separator 122 outputs the resource data using the hardware resource decoder to the video decoder based on the control signal of the CPU 126. Other data are input to the memory 130 via the bus 127.

FIG. 11 shows more detailed operations of the fourth embodiment.

Respective data 1101 shown in FIG. 11 are the application elements contained in the transport stream. In this embodiment, a resource data 1102 which is possible to use the hardware resource decoder are considered as the video data to be shown in the video data, so as to be separated from other application elements. The resource data 1102 considered as the video data are decoded in the video decoder 123, so that the output signal is input to the video processor 1000. The output signal from the video processor 1000 is input to an application decoder 1106 realized by a software.

According to the fourth embodiment, since the decoding of the resources are executed by the hardware it shorten the display time. Usually in the digital broadcast receiver, since the video decoder executes the compressed decoding by the MPEG-2 the resources are compressed by I flame form of the MPEG-2, so as to realize the functions explained above. In this case, the video processor 1000 needs just the function to buffer the image of MPEG-2, so that the actual hardware is a small scaled.

Figure 12:
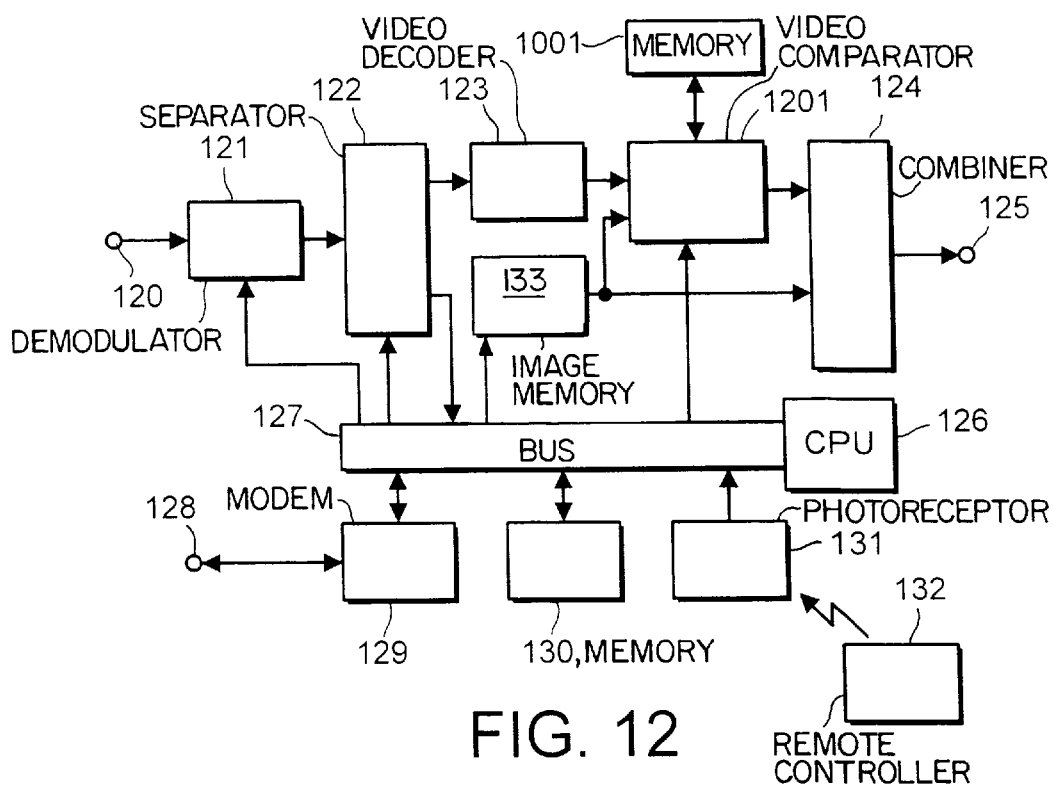
FIG. 12 is a diagram showing the construction of the hardware resource decoder in the sixth embodiment.

FIG. 12 shows the fifth embodiment which is applied to the fourth embodiment.

The differences from the fourth embodiment is that the video processor is replaced by a video compandor 1201, and the decoded image signal is not output to the bus 127. In this embodiment, the image signal decoded in the video decoder 123 is output to the combiner 124 via the video compandor 1201 directly. The video compandor 1201 compresses the image and displays it on the specific picture position based on the picture position information stored in the input object data and the picture size information.

FIG. 13 shows the operations.

The difference form FIG. 11 is that the output form the video decoder is input to the video compandor 1201, and the outputs output separately from the output of the application decoder. That is, in case of displaying the resources separately from the application decoder only the object information which is decided by the application decoder is applied to the hardware, so as to construct the application. For instance in case that the resources are defined as the moving picture, the graphical data displayed as the object is animated, so that it can get the same effect as PIP (Picture in Picture).

Figure 14B:
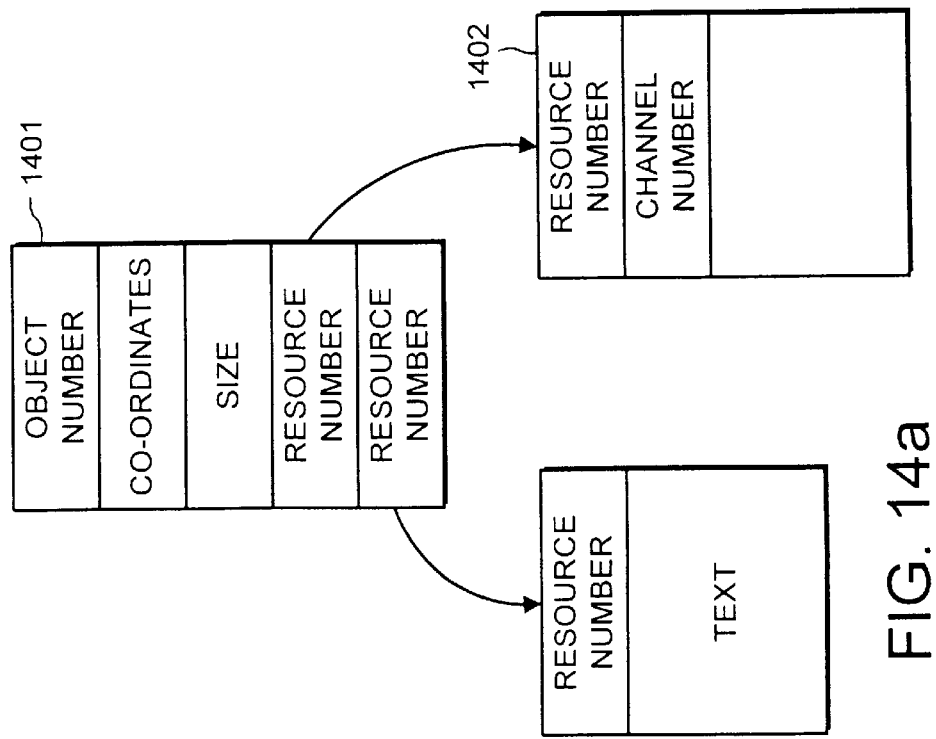
FIG. 14 is a diagram for explaining the video resource.
Figure 14A:
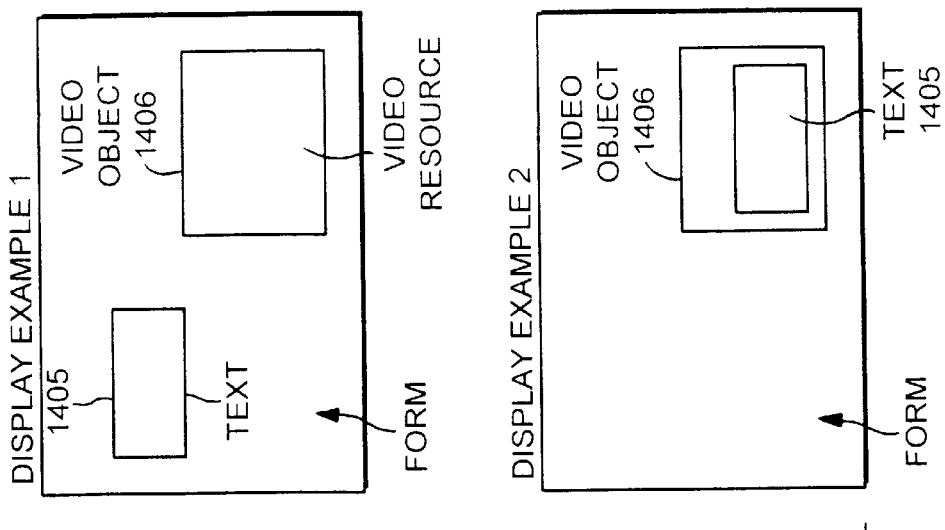

FIG. 14A shows more detailed operations.

A video object 1401 is defined newly, where the object number, the picture display position, the picture size and the resource number are stored. In a resource 1402 shown by the resource number the resource number, the protocol number and the stream ID are defined.

The fifth embodiment is operated by the application decoder of the fourth embodiment shown in FIG. 9. The video object input the information to the controller 207 from the object defining portion 213. The controller 207 outputs the control signal to the hardware decoder interface 901. Then the information is output to the external hardware from the output terminal 902. The coordinates and the size information defined in the object are output to the video compandor 1201 and output to the stream ID separating decoder 122.

The picture shown in the sixth embodiment is shown in the FIG. 14B. An object 1405 such as a usual text is processed in the application decoder and output. The frame of a video object 1406 is processed and output by the application decoder. However, the image displayed in the video object is displayed directly by the output of the video compandor 1201 as the video resources.

FIG. 15 shows the expanded figure of the sixth embodiment.

Like a form 1510 as shown in FIG. 15B, in case that the form contains several video objects each video objects realize the EPG function. For instance, when to a stream 1500 shown in FIG. 15A the form is transmitted, where the stratum stream objects of streams 1501, 1502 and 1503 are exist, the table of the present programs is constructed in an exemplified picture 1504 as shown in FIG. 15C. Further a large quantity of the program contents are shown as the text, the program table corresponding to the protocols is constructed in an exemplified picture 1505 as shown in FIG. 15D.

Figure 16:
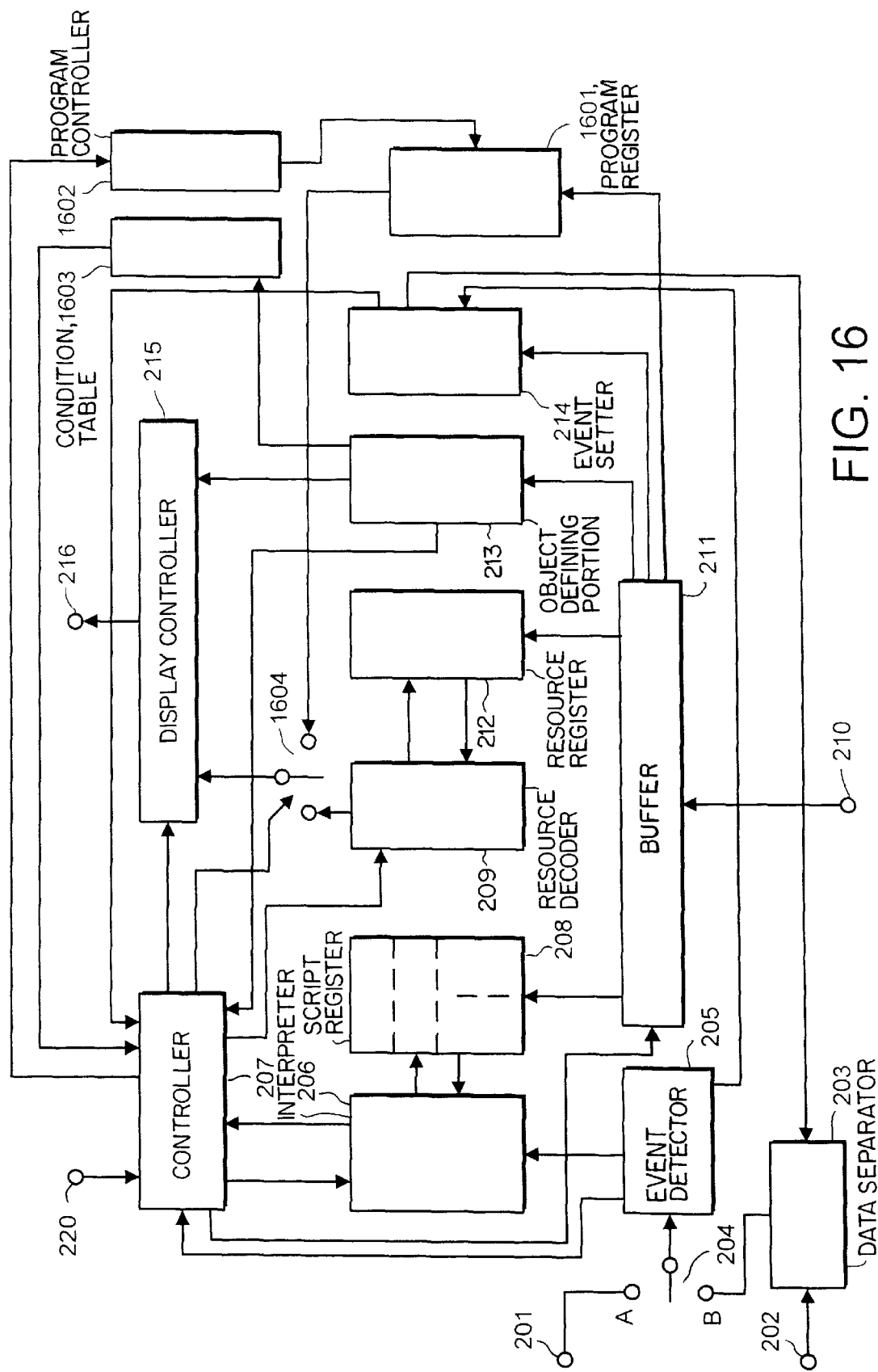
FIG. 16 is a diagram showing the construction of the application decoder in the eighth embodiment.

FIG. 16 shows the eighth embodiment.

The difference from the first embodiment is that an execution program register 1601, an execution program controller 1602, a condition table 1603 and a switch 1604 are added. The eighth embodiment defines the execution program as the resources. For instance, it downloads the software for browsing of the internet and carry out it.

In the embodiment, it explains about one execution program, however, it is adaptable to more than two programs. In eighth embodiment the following operations are executed.

(1) The application elements are input from the input terminal 210. From the input data the buffer 211 stores the script to the script register 208, the resources to the resource register 212, and the object to the object defining portion 213. However, if the resources are execution programs, the resources are stored in the execution program register 1601.

(2) The resources are stored in the execution program register 1601 based on the control signal output from the object defining portion 213. Further, the execution program is registered in the condition table to tell its existence. This table registers several conditions.

(3) The execution program starts the operations according to the control of the execution program controller 1602. At that time, the output of the resource decoder 209 is stopped, and it is changed to the graphic data of the execution program as the resources.

(4) The operations mentioned above is started, carry out is registered in the condition table 1603, and the operation is ended end is registered. Here, the event can end the operation forcibly according to the control of the controller 207.

Figure 17A:
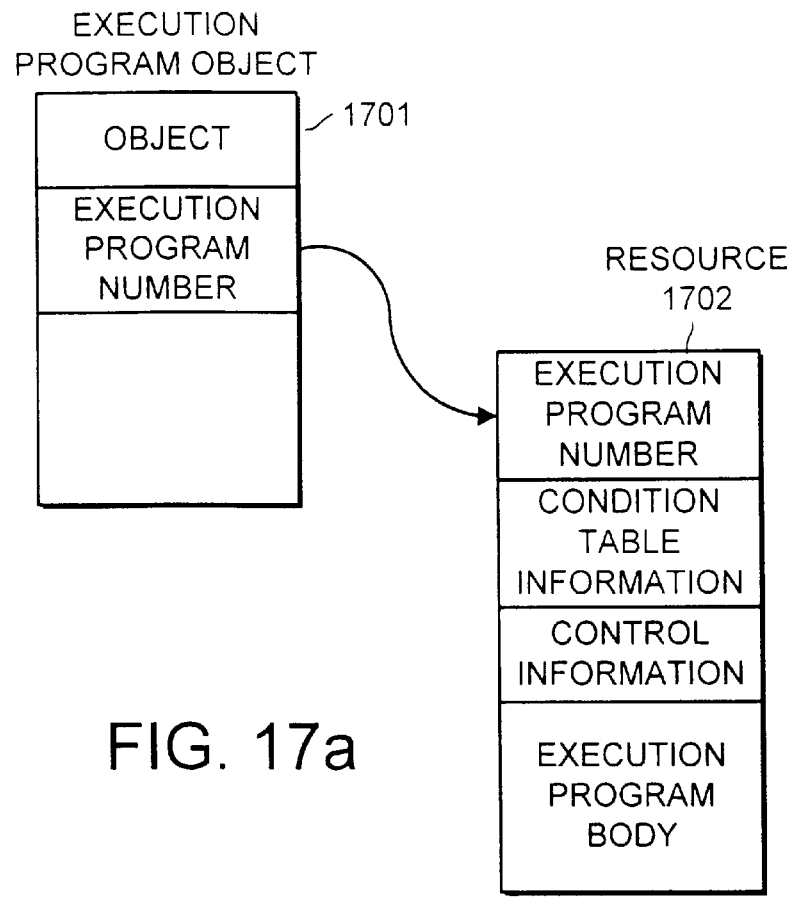
FIG. 17 is a diagram showing the construction of the execution program and the display screen.

FIG. 17A shows the definition of the record when the execution program is considered as the resources. In the resource 1702 specified by the execution program object 1701, the information registered in the condition table, the control information, and the execution program are stored.

Figure 17B:
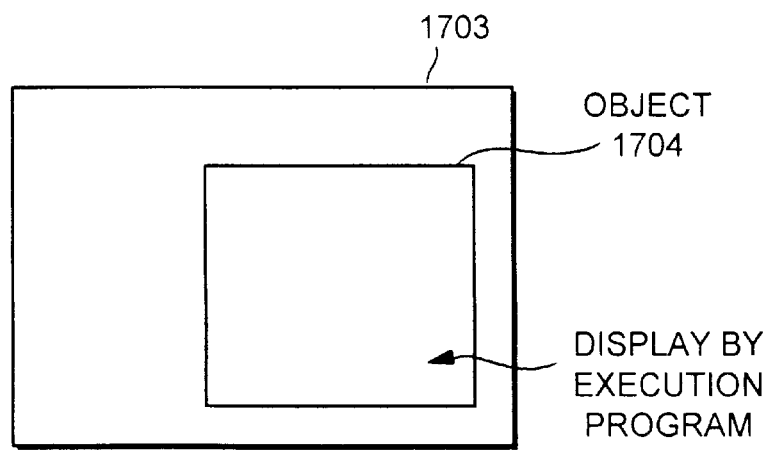

FIG. 17B shows the display example 1703 realized by the execution program. It shows that the execution program is operated and displayed inside the object 1704.

Figure 18:
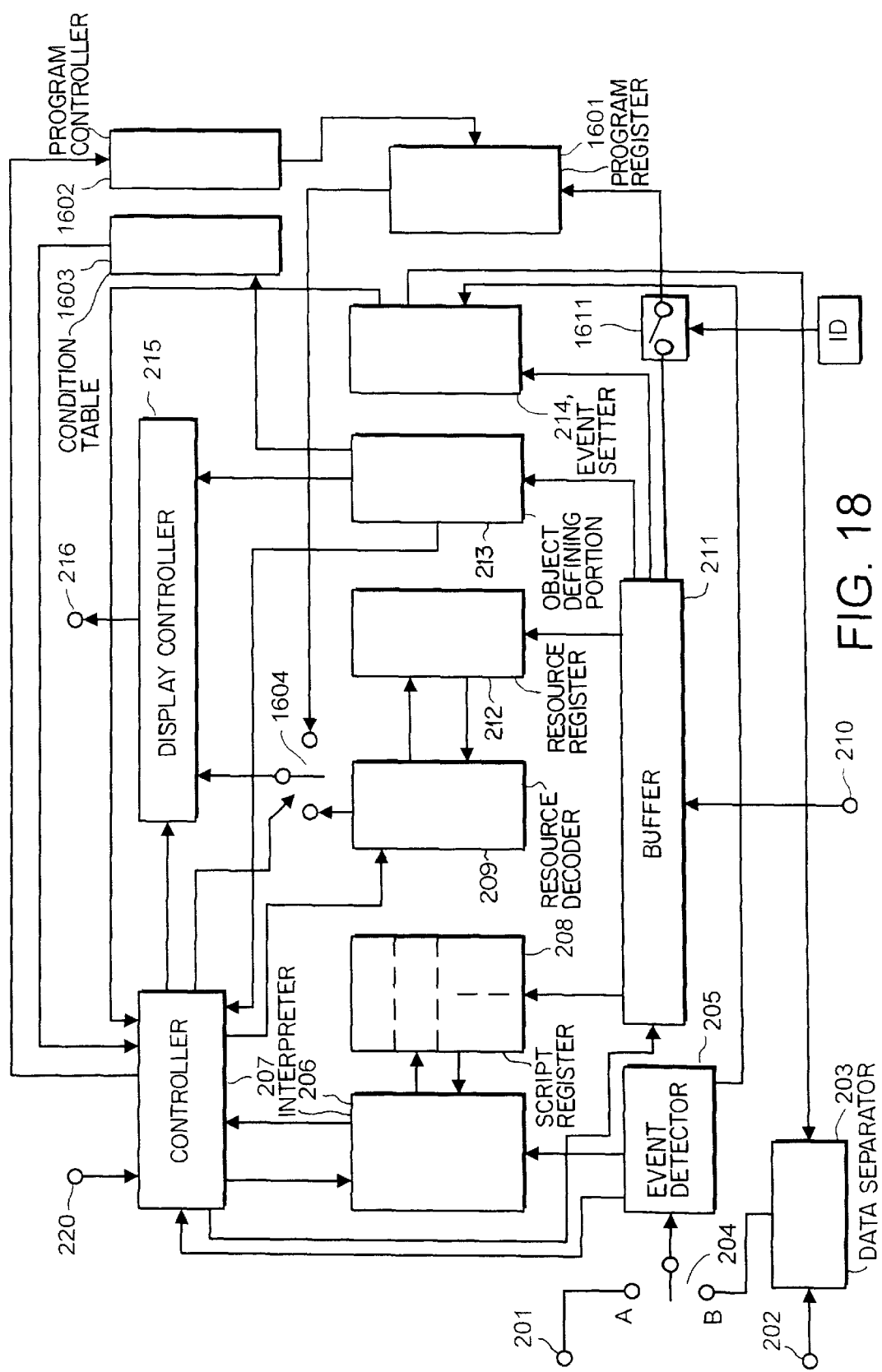
FIG. 18 is a diagram showing the construction of the application decoder in the ninth embodiment.

FIG. 18 shows the ninth embodiment. The difference from the embodiment shown in FIG. 16 is that a switch 1611 is provided between the buffer 211 and the execution program register 1601, and the switch 1611 is turned on only when the user gives a specific secret key (ID). Accordingly, the specific resources are adapted to toll system or parental code.

Figure 19:
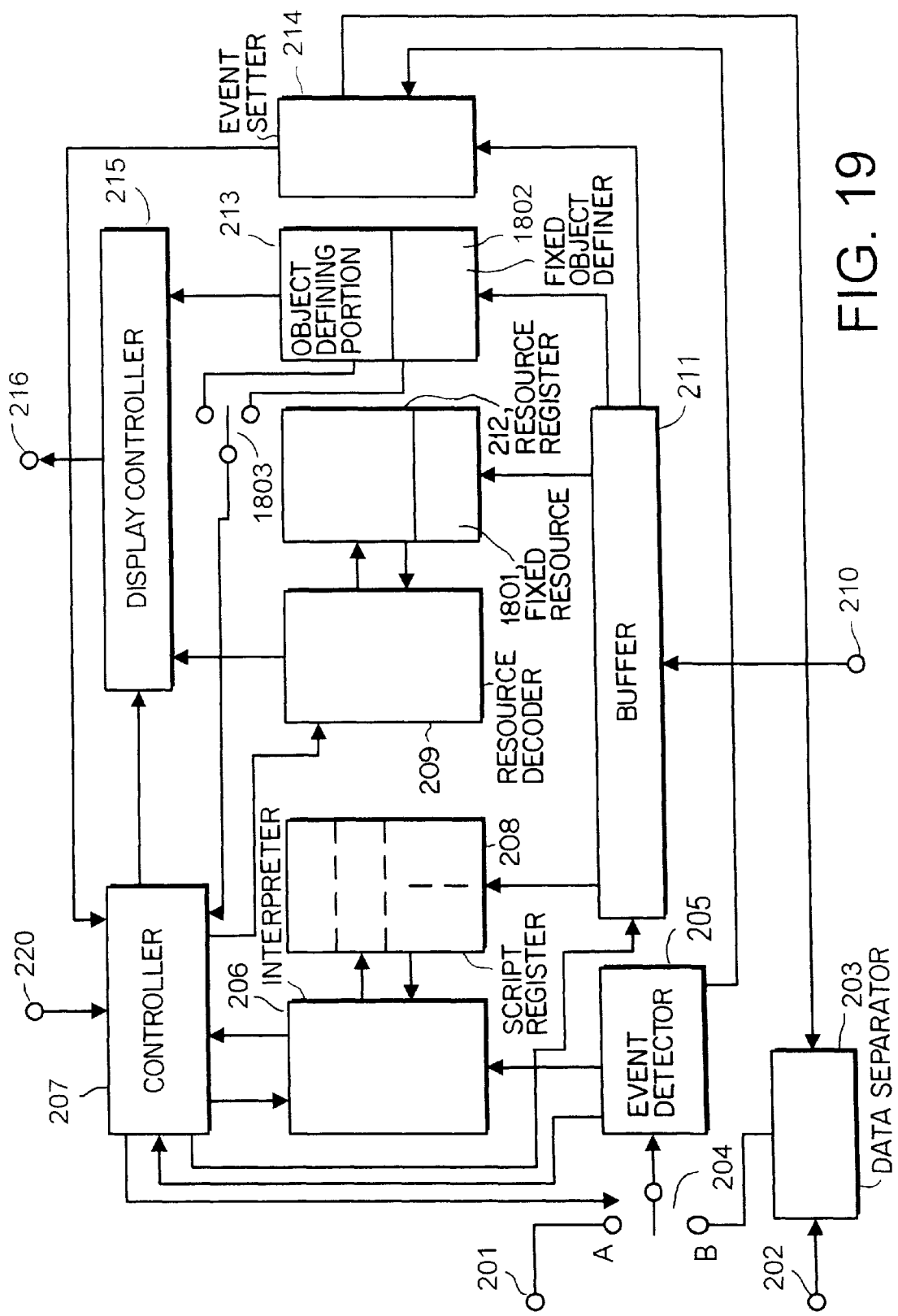
FIG. 19 is a diagram showing the construction of the OSC function decoder.

FIG. 19 shows the tenth embodiment. The difference from the FIG. 2 is that a fixed resource 1801, a fixed object definer 1802, and a switch 1803 are added. In the tenth embodiment the application is operate by the fixed object, resources and script stored inside the receiver without being transmitted. That is, it is possible to be used in substitution for the OSD function which is peculiar to the TV receiver, and it does not need to have another OSD function, so as not to increase the hardware. Further it is possible to reduce the transmission capacity by storing the object which is displayed at all times.

The present invention is not limited to the embodiments described before.

First, the background of other embodiment will be explained. In the specification (document $) IOAP Protocol Ver.1.0 Technical Specification which is made based on the specification (document 1) (international application unveil number WO96/34466) of the information accompanied with the programs the information unit referred as the block is defined. In this block header information there is a filed-IBH PRIORITY LEVEL showing the priority over the blocks. If the field value is 0, 6, or 7, the block sometimes contains the urgent message so as to be processed in advance. On the other hand, in the digital data transmission specification (document 2) (ISO/IEC 13818-1) the data transmission unit on the lowest stratum referred as the transport packet is defined. In the transport packet header information there is the field transport priority (1 bit) showing the priority over the packets. When the field value is 1 it means that the packet must be processed in advance.

Here, as shown in FIG. 20, when the block which is the information unit is divided by adjusted to the packet which is the transmission unit and transmitted, and in case of the block having the IBH PRIORITY LEVEL value is 0, 6, or 7, it is transmitted as the transport priority of the packet containing the elements is 1 (the packet having high priority).

FIG. 20 shows that the BL2 has a high priority among the block sequence BL1, BL2, and BL3, and its IBH PRIORITY LEVEL is either 0, 6, or 7. Here when the block is divided into the packets, the data of the block BL2 are divided over the packets PCK1, PCK2, and PCK3. In this case, even if the all data of the packet are not BL2 the data are transmitted as the transport priority of the packet containing the element is 1 (the packet having the high priority).

In the example mentioned above, the data are assigned to the packet directly from the block. However, it is apparent that the case that the data assigned to the lowest stratum via the defined data unit in the middle is not departed from the principle of the present invention.

FIG. 21 shows that the display form information is divided into the block mentioned in the document 1 (see FIGS. 21a and 21b), is converted into the stream of the format mentioned in the document 3 (see FIGS. 21c and 21d), and is converted into the stream of the format mentioned in the document 2 (see FIG. 21e). In this case, the information showing the high priority is mentioned on the lowest stratum. As shown in FIG. 21, that the data carrousel system of the DSM-CC which transmits the contents repeatedly lays in the middle is adapted to transmit the data to the software processing decoder (see FIG. 11 and FIG. 13). Further it is adapted to the case that the script or important data which can be transmitted having enough time are transmitted.

FIG. 22 shows that the display material information is divided into the blocks mentioned in the document 1 (see FIGS. 22a and 22b), and converted into the stream of the format mentioned in the document 2 (see FIGS. 22a and 22b). In this case, the information showing the high priority is mentioned on the lowest stratum also. As shown in FIG. 22, when the display material is converted into the format mentioned in the document 2 directly it can be decoded in the main video decoder, so that it is effective when it is transmitted as the hardware information (see FIG. 11 and FIG. 13).

According to the present invention, the prior processing information on the transmission protocol which transmits the program or the information accompanied to the program is decided based on the processing prior information of the information accompanied to the program. And the processing priority information of the information accompanied to the program may be the IBH PRIORITY LEVEL in the document 1, and the priority processing information on the transmission protocol may be the transport priority in the document 2, or may be the elementary stream priority indicator in the document 2.

As mentioned above, it is possible to know the data to be processed in advance by the transport packets or PES priority which are processed in early stratum after receiving, so that the information given priority can be processed fast.

The present invention is not limited to the embodiments mentioned above.

In the document 1 which is the specification of the information accompanied to the program defines the information carry out unit called the application. The application is assigned the unique number at the field called IAppUIC. On the other hand, in the document 3 which is transmission specification of the digital data, it is transmittable by having the data units called the module inside the transmission unit identified by the identification called the download ID. FIG. 23 shows the construction of the DownloadlnfoIndication field defining the data transmission contents which is defined in the document 3. In the above diagram since the details of the each fields are shown in the document 3 these are omitted here. The downloadID on line 3 in the chart shown in FIG. 23 shows the identification number of the defined data unit. Form the first line the module contained in the data unit defined by the downloadID is defined. In this present invention, the application is assigned to the module which is the data unit. The application has the moduleID which is the unique identification per each download ID. On the line 17, the modulelnfoByte which applies the individual information of the module (here it is application) is defined. Here, the IAppUIC of the application which is corresponding to the modulelnfoByte is applied in the present invention.

In the present invention mentioned above, the information showing the carry out unit of the information accompanied to the program is corresponded to the information showing the transmission unit of the carry out unit. Here, the information showing the carry out unit of the information accompanied to the program may be the IAppUIC in the document 1, And the information showing the transmission unit of the carry out unit may be the moduleID in the document 3. Further, the corresponding means may be the means that the IAppUIC is mentioned in the moduleInfoByte field corresponding to any moduleID from the DownloadIngoIndication in the document 3.

In the conventional embodiment, when the new application is operated by the user, which data are kept in the memory for carrying out the application is not judged till the module is resolved into the application after the data are received. However, in the present invention, if the application is designated by the user it refers the module ID from the IAppUIC and knows the data to be processed on the earlier stratum after receiving the data, so as to gather the data in the memory for carrying out the application quickly with less processing load.

Further, the present invention is not limited to the embodiments mentioned above.

In the document 1 which is the specification of the information accompanied to the program, the information carry out unit called the application is defined. In this application, the information designs the display form or the information of the display material, for instance the image data are contained. In the document 3, the protocol for transmitting the data are defined according to the protocol shown in the document 2. As one embodiment of the present invention, the cases that the information indicating the display form is transmitted by using the first transmission protocol according to the protocol shown in the document 3, and that the information of the display material, for instance the image data is transmitted by using the second transmission protocol according to the document 2 are explained hereinafter.

As shown in FIG. 21, the display form information indicating the display form (FIG. 21a) is stored in the block defined in the document 1 (FIG. 21b). The block is stored in the block data bytes of the data units (FIG. 21c) defined in the document 3. Here, since the block size is adjusted to the upper limit of the information amount of the block data bytes, the data of the display form information is also adjusted to the size to be divided, then these are stored in the block. The data unit (FIG. 21c) is stored in the second data unit added the header (FIG. 21d) according to the document 3. The data unit is divided into the payload of the packet added more header (FIG. 21e) according to the document 2 and stored. The protocol in the document 3 provide the data ζ function for transmitting the fixed information unit repeatedly. The display form information may be transmitted repeatedly according to the protocol.

On the other hand, as shown in FIG. 22, the display material information (FIG. 22a) is stored in the block defined in the document 1 (FIG. 22b). The block is divided into the payload of the packet added the header (FIG. 22c) according to the definition of the document 2 and stored. The packet in which the block is stored, which is the transport packet that the stream type defined by the document 2 takes the value from 0x80 to 0xFF by its header, so called the private data packet, shows that the block is stored.

In the present invention explained above, when the information accompanied to the program is transmitted, the information amount in the information unit or the transmission protocol according to the necessary transmission time are selected. In this case, the selected first transmission protocol may be based on the DSM-CCa protocol defined in the document 3, and the selected second transmission protocol may be based on the other protocols. In this case, the second transmission protocol may be formed by the transport packet which the stream type takes the value from 0×80 to 0×FF in the document 2. Further in this case, the information unit, when the second transmission protocol is selected, may be a record of the resource define type in the document 1.

In the present invention mentioned above the following statement will be made.

The protocol in the document 3 can transmit the detailed information such as the definition of the application. However, if the original data are great in amount because of the deep data unit stratum and its limited size, the original data are sometimes defined and added the header per each data units. So, the data transmission efficiency are gone down, and there is the processing load to resolve the stratum data on the receiving side. However, in the present invention, since the data having the small amount of information are transmitted in the first transmission protocol, and the image data having a large amount of data are transmitted by using the less stratum second protocol, it provides the detailed information transmission, the transmission efficiency and the decreased of the processing load. Further, since the former are transmitted as the private data of the document 3 and the latter are transmitted as the private data of the document 2, the final data transmission forms are unified to the transport packet of the document 2, so as not to prepare the other second transmission protocol.

The summary of each points of the present invention will be described hereinafter.

First, in the intelligent digital television receiver which receives the video, the audio and the data transmitted in a digital broadcast, and executes the application either by executing together with the video or audio or separately, it has the object, the resources, and the form, and the script as the application elements, and it generates the event based on the event executing information stored in the stream of the digital data as the object, so that the application is controlled.

The object contains the specific event condition, based on which the application is controlled. The resources are updated at the timing of the event generated from the object.

The resources may be updated continuously by the buffer control based on the event timing. Further, the resources may be decoded by the decoder program which is downloaded by the broadcast wave or the two-way network.

Here the decoding of the resources may be executed by the hardware decoder. In this case, the decoding is realized by using only the I flame decoding operation of the MPEG-2. The data decoded by the hardware decoder may be supplied to as the input to the application decoding processor constructed by the software which decodes the application elements.

Further, the video data decoded by the hardware decoder is compressed by the information based on the definition of the object output from the software decoder, and the compressed video and the graphical object output from the software decoder are processed separately, then each data may be synchronized. Further, it may have a function to make the data to the hardware decoder the input data by controlling the means to separate the data according to the control signal based on the object defining information.

As the object at least the picture size and the display position may be defined. In the resources related to the object the protocol information and the stream ID information may be stored. And, as the related resource the text may be defined, and as the object the video display may be controlled.

Further, it may be provided with a means to construct the program guide by displaying at least one of the several protocol information and the semi-still image in order, by using the form containing several objects.

Further, it may be provided with a condition management table, execution program storing area and the function to download the execution program as the resources and control the execution program based on the object definition. Furthermore, it may be provided a means for executing the on screen display (OSD) adjusting the parameter of the receiver according to the built-in application elements. Here the built-in application elements and the new transmitted application elements may be operated together.

Furthermore, in the digital broadcast which the program information is converted into the transmission format and transmitted, the prior processing information on the transmission protocol is arranged in the packet corresponding to the program information on the transmission format when there is the processing prior information accompanied to the program information. And in the intelligent digital television system which digitally broadcasts the video, the audio, and the digital data, and executes the application on the receiver side by executing together with the video or separately, the information showing the carry out unit of the information accompanied to the program is correspond to the information showing the transmission unit of the carry out unit.

When the information accompanied to the program is transmitted, the transmission protocol for decoding is selected according to the information amount or the necessary transmission time per the information unit. The transmission protocol contains the first protocol based on the software, and the second protocol based on the hardware application.

The present invention is constructed to realize the image improving function in case of transmitting the figure information.

Figure 24:
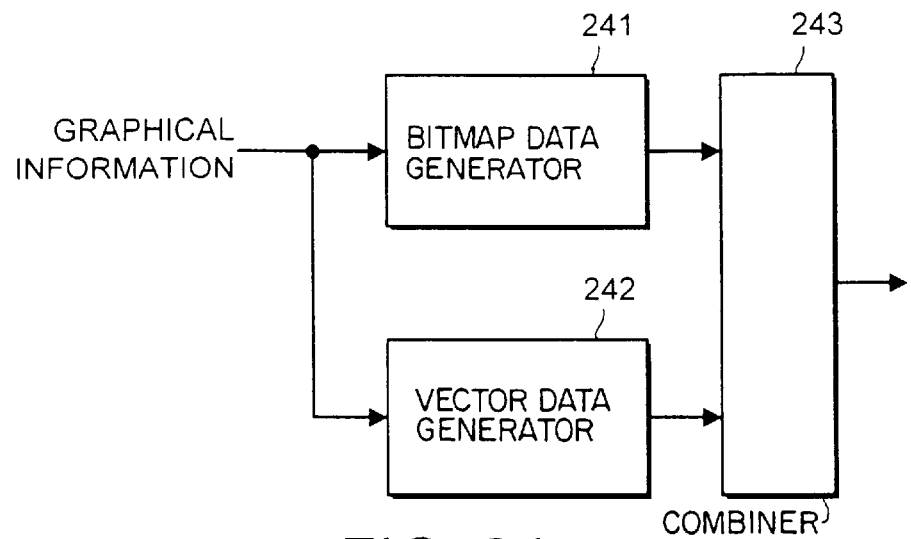
FIG. 24 is a diagram showing the construction of the figure information transmitter.

FIG. 24 shows one embodiment of the figure information transmitter. The figure information as the input to the device is input to a bitmap data generator 241, from which the bitmap data are output. The output bitmap data construct a picture by the scores of or hundreds of pixels in the horizontal and vertical direction, and uses one-dimensionally arranged set of the value that the color information of the pixels is shown by several or scores of bits. On the other hand, the figure information is also input to a vector data generator 242, from which the vector data are output. The vector data expresses the outline of the character or picture constructing the input figure, for instance it expresses the lines constructing the outline as a set of lines and arranges these lines as a pair of the coordinates of the start point and the end point. The outputs from the bitmap data generator 241 and the vector data generator 242 are input to a combiner 243, from which these are output as one data and transmitted.

As the construction of the combiner 243, for instance in the inter-text system which is one of the two-way television systems, there is a means that it is encoded as the bitmap object which buries the vector information as the hint information.

In the embodiment shown in FIG. 24, the bitmap data and the vector data are generated from the original figure information. However, in the case that the figure information for generating the vector data is not used as the input from the problem of compatibility with the conventional apparatus which transmits only the bitmap data, it may be realized by following construction.

Figure 25:
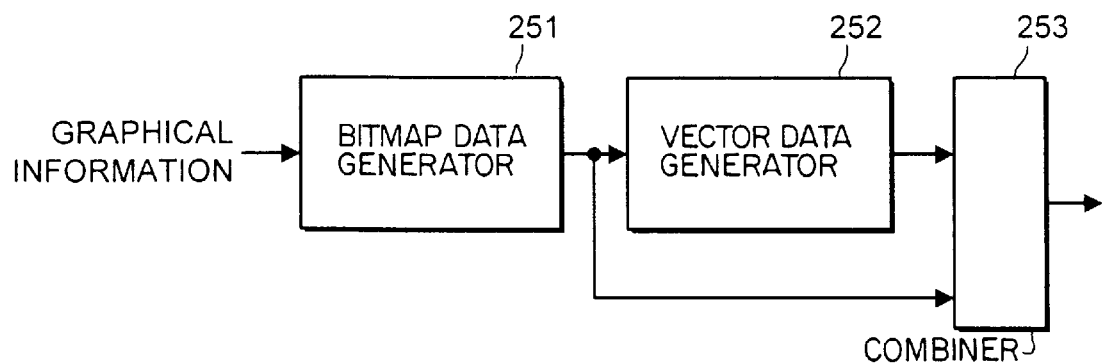
FIG. 25 is a diagram showing the construction of the figure information transmitter.

As shown in FIG. 25, the input of the vector data generator 252 may be output from a bitmap data generator 251. In this case, a vector data generator 252 uses the edge detection algorithm for extracting the outline of the figure from the bitmap data.

According to the present invention described above, it is the figure information transmitter for transmitting the figure information as the bitmap form data and for transmitting the vector information showing the direction of the figure expressed by each bitmap constructing pixels by adding to the bitmap form data. That is, the present invention is provided with the bitmap data generating means for generating the bitmap form data from the figure information, the vector data generating means for generating the vector data from the figure information, and the data synthesizing means for synthesizing the generated bitmap data and the generated vector data. Further, the present invention is provided with the bitmap data generating means for generating the bitmap form data from the figure information, the vector generating means for generating the vector data from the bitmap data generated in the bitmap data generating means, and the data synchronizing means for synchronizing the generated bitmap data and the generated vector data.

Figure 26:
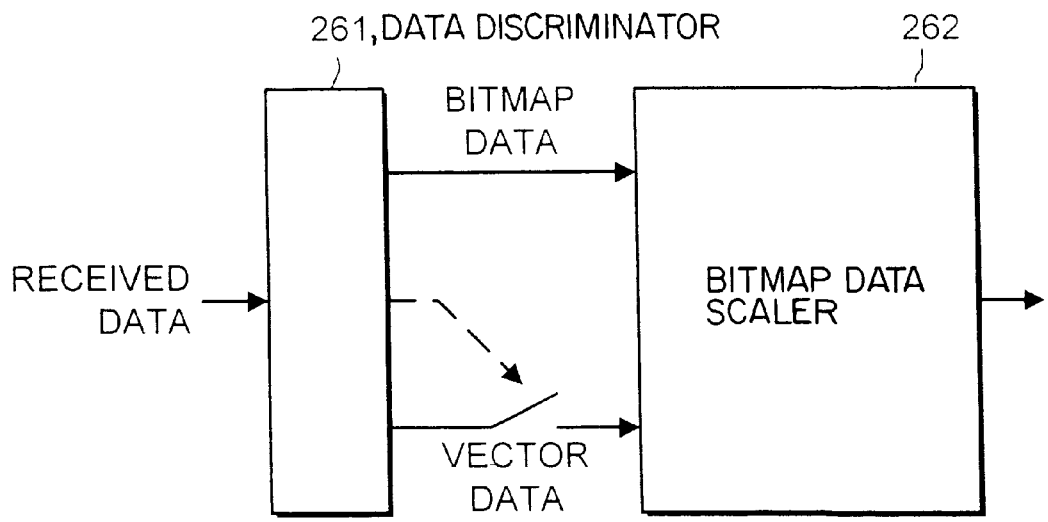
FIG. 26 is a diagram showing the construction of the figure information receiver.

FIG. 26 shows the figure information receiver, to which the data which are the synthesized data of the bitmap data and the vector data and which are output of the FIG. 24 and FIG. 25, or the data which are composed of only the conventional bitmap data are input.

The input data are input to a data discriminator 261, which discriminates whether the vector data are contained in the input. As the judging way, for instance when the input data are the bitmap object in the inter text system it is judged by referring to the graph showing the existence of the hint information.

Here, the judging device 261 judges that the vector data are contained in the input, the bitmap data and the vector data contained in the data are taken out and input to the bitmap data scaler 262. The bitmap data scaler 262 generates the bitmap data having the different constructing pixel number from the input out of the input bitmap data and the vector data and outputs them. The output is expressed as the display on the TV screen or the printing from the printer.

When the judging divide 261 judges that the vector data are not contained in the input data, the bitmap data scaler 262, to which only the bitmap data are input, generates the bitmap data having the different constructing pixel number out of the input bitmap data and outputs them. Accordingly, it can receive the data transmitted from the conventional transmitter which does not transmit the vector data without any problems.

In the embodiment of the receiver mentioned above, when the vector data are not contained in the input data, the bitmap data scaler 262 scales up and down the bitmap data from the bitmap data. However, when the conventional formed data containing only the bitmap data are received the vector data may be used fr the enlargement or reduction of the bitmap data.

Figure 27:
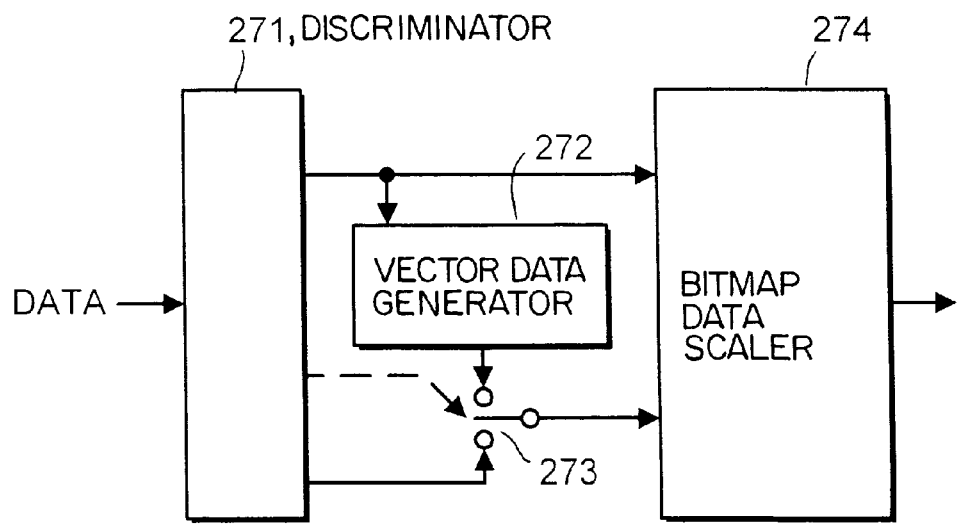
FIG. 27 is a diagram showing the construction of the figure information receiver.
Figure 28:
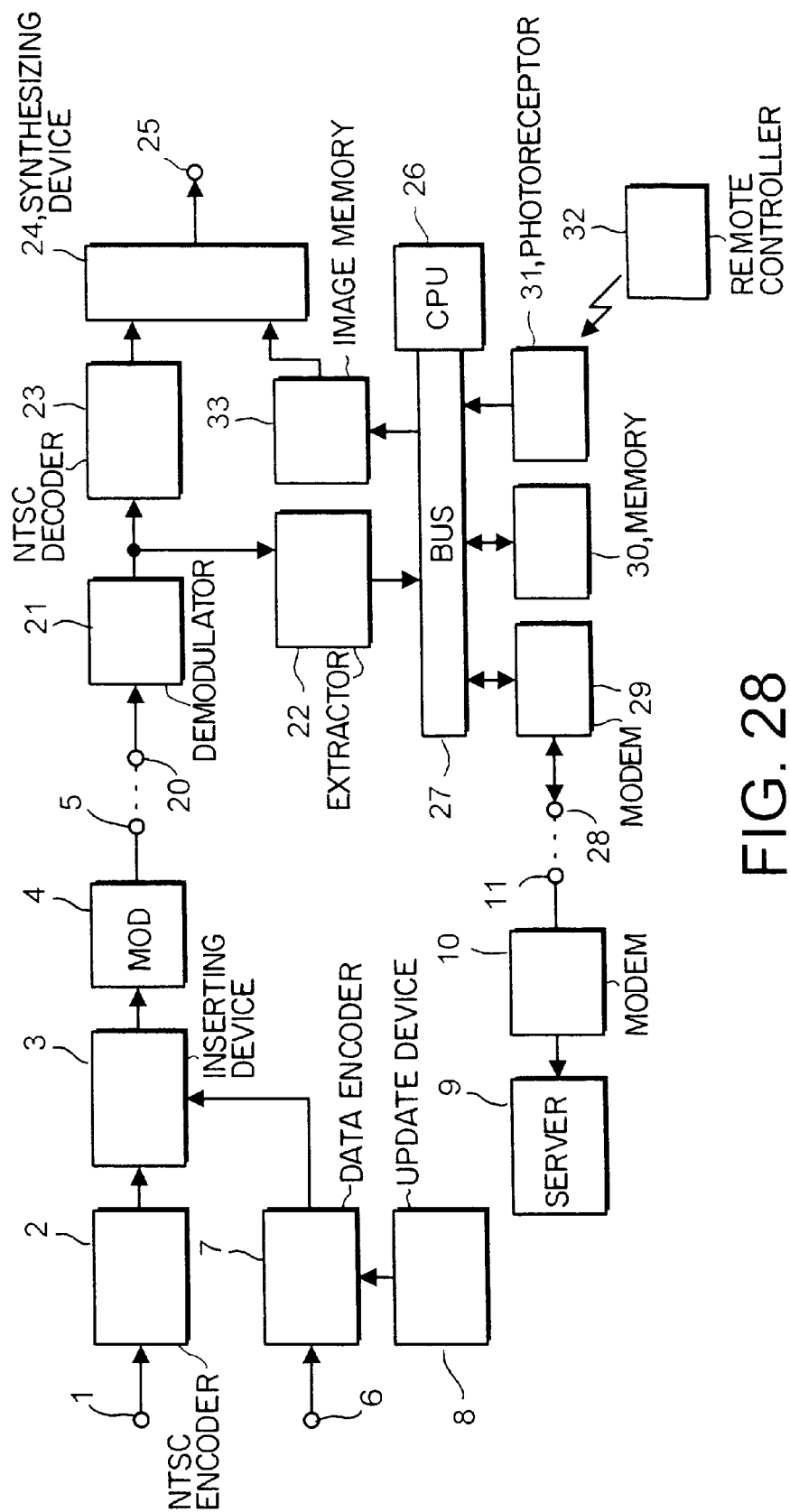
FIG. 28 is a diagram showing the construction of the conventional data transmission receiving system.
Figure 29A:
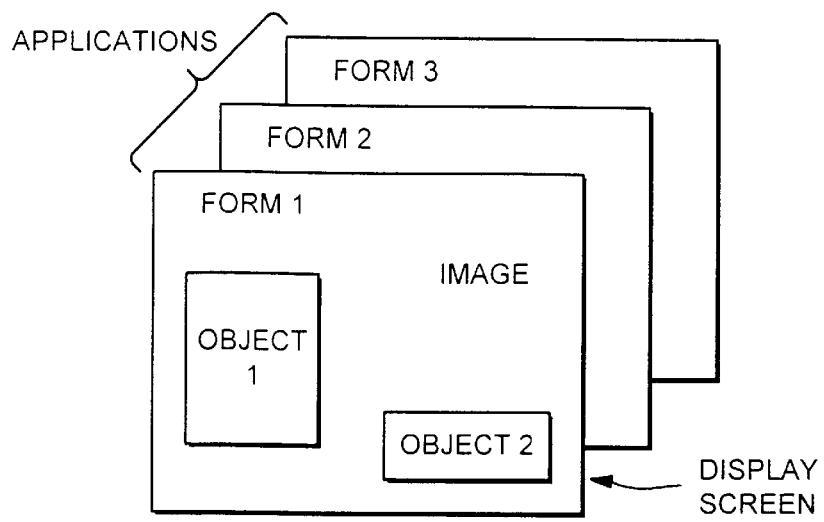
FIG. 29 is a diagram showing the construction of the application.
Figure 29B:
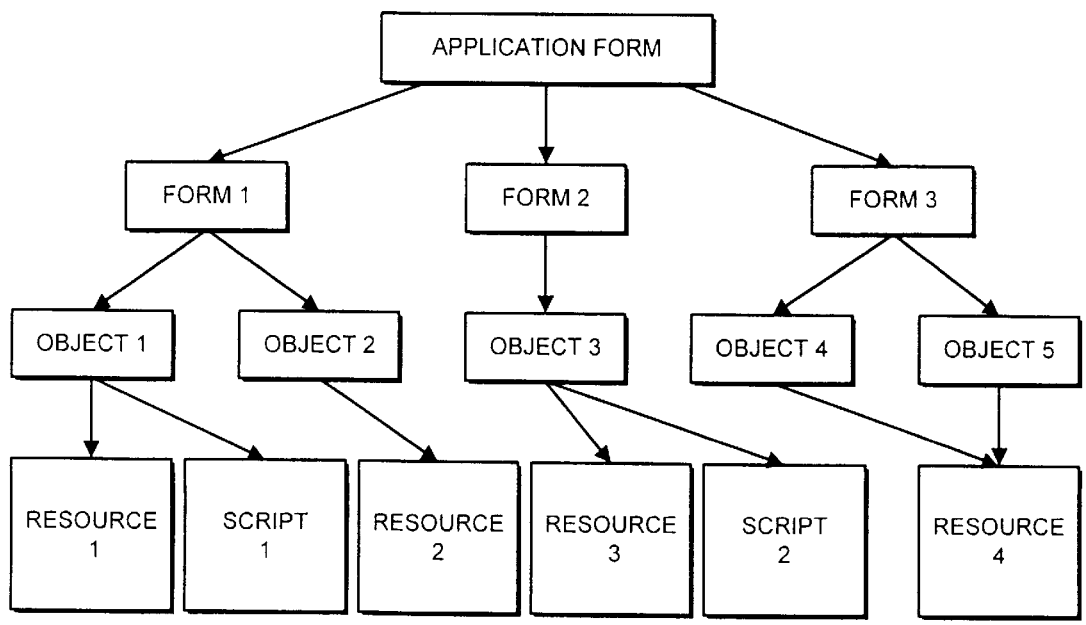
Figure 30:
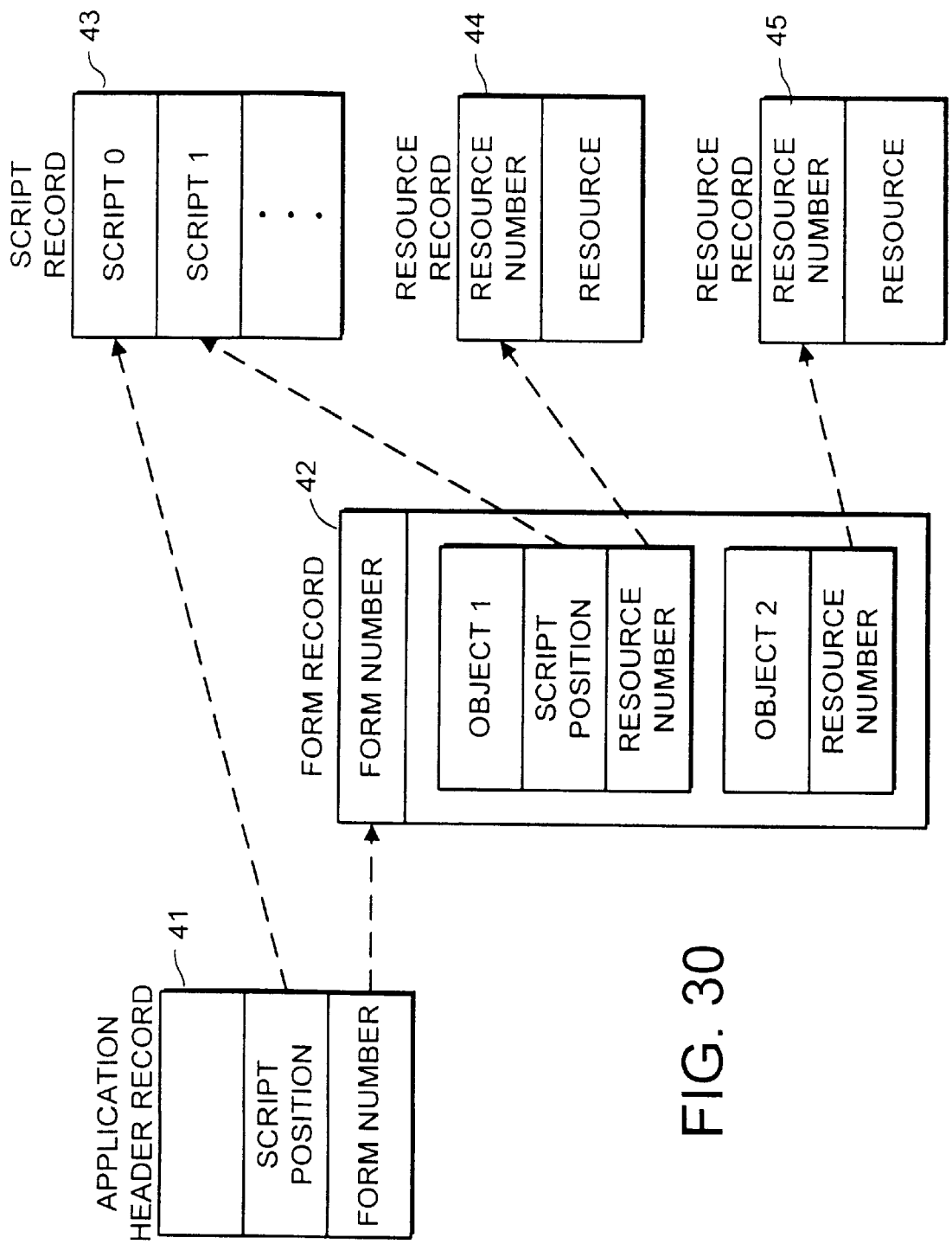
FIG. 30 is a diagram showing the construction of the application by the record.

As shown in FIG. 27, when the conventional formed data containing the bitmap data are received through a discriminator 271, the data may be input to a vector data generator 272 for generating the vector data from the bitmap data, and input to a bitmap data scaler 274 via a switch 273. At that time the vector data are contained in the data, the data are input to the bitmap data scaler 274.

Accordingly, the present invention is the figure information receiver for receiving the figure information transmitted by the figure information transmitter, which is provided with the judging means for judging whether the vector data are contained in the received data or not. When the judging means judges that the vector data are contained in the received data, it generates the bitmap data having the different constructing pixel number from the received bitmap out of the received bitmap data and the vector data. When the judging means judges that the vector data are not contained, it generates the data out of only the received bitmap data.

The present invention is the figure information receiver for receiving the figure information, which is provided with the judging means for judging whether the vector data are contained in the received data or not, and the vector data generating means for generating the vector data from the received bitmap data. Further it generates the bitmap data having different constructing pixel numbers from the received bitmap out of the bitmap data and the vector data when the judging means judges the vector data are contained in the received data, and out of the vector data output from the received bitmap and generating means when the judging means judges the vector data are not contained in the received data.

The system contains the figure information transmitting means for transmitting the figure information as the bitmap data, by which the vector information showing the direction of the figure expressed by the pixels constructing the bitmap is transmitted by added to the bitmap data. And, it is provided with the bitmap generating means for generating the bitmap data from the figure information, the vector generating means for generating the vector data from the figure information, and the data synchronizing means for synchronizing the bitmap data generated in the bitmap data generating means and the vector data generated in the vector data generating means. Further it is also provided with the bitmap data generating means for generating the bitmap data from the figure information, the vector data generating means for generating the vector data from the bitmap data generated in the bitmap data generating means, and the data synchronizing means for synchronizing the bitmap data and the vector data.

Further, it is provided with the judging means for judging whether the vector data are contained in the received data. And it generates the bitmap data having different constructing pixel numbers from the received bitmap, out of the received bitmap data and the vector data when the judging means judges the vector data are contained in the received data, and out of only the bitmap data when the judging means judges the vector data are not contained in the received data. Furthermore, it is provided with the judging means for judging whether the vector data are contained in the received data, the vector data generating means for generating the vector data from the received bitmap, and the bitmap data generating means for generating the bitmap data having the different constructing pixel numbers from the received bitmap out of the bitmap data and the vector data when the judging means judges the vector data are contained in the received data, and out of the received bitmap and the vector data generated from the vector data generating means when the judging means judges the vector data are not contained in the received data.

As described above, the intelligent digital television receiver of the present invention can receive the data multiplexed with the video or the audio which are transmitted by the digital broadcast, and it is possible to execute a new service by the video, the audio, or the data. Accordingly, the intelligent digital television receiver of the present invention cam improve the functions greatly without adding great deal of hardware or software. Further, the intelligent digital television receiver of the present invention can execute the application which is supplied in the conventional embodiment without any problems, and it is possible to maintain the compatibility.

As described above, the present invention can provide an extremely preferable intelligent digital television receiver.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An intelligent digital television receiver comprising:

means for receiving a video signal, an audio signal, and a digital data transmitted in a digital broadcast;

means for executing a particular application based on the received digital data by itself or in connection with the received video and audio signal;

means for controlling execution of a plurality of applications by generating events according to event start information, the event start information including time information contained in a digital data stream as an object which comprises an element of the particular application, the plurality of applications including the particular application; and means for controlling execution of the particular application;

wherein the particular application includes a resource as an element thereof, the resource being decoded by a hardware decoder using only a decoding operation of I-frames in a MPEG-2 flame decoding operation.

2. An intelligent digital television receiver comprising:

means for receiving a video signal, an audio signal, and a digital data transmitted in a digital broadcast;

means for executing a particular application based on the received digital data by itself or in connection with the received video and audio signal;

means for controlling execution of a plurality of applications by generating events according to event start information, the event start information including time information contained in a digital data stream as an object which comprises an element of the particular application, the plurality of applications including the particular application; and means for controlling execution of the particular application;

wherein the particular application includes a resource as an element thereof, the resource being decoded by a hardware decoder, the hardware decoder decoding image data that is compressed by information based on an object definition output from a software decoder, the software decoder outputting a graphical object, and the compressed image data and the graphical object being processed independently and synthesized.

3. An intelligent digital television receiver comprising:

means for receiving a video signal, an audio signal, and a digital data transmitted in a digital broadcast;

means for executing a particular application based on the received digital data by itself or in connection with the received video and audio signal;

means for controlling execution of a plurality of applications by generating events according to event start information, the event start information including time information contained in a digital data stream as an object which comprises an element of the particular application, the plurality of applications including the particular application;

wherein the object defines at least a picture size and a display portion to store protocol information and ID information of the digital data stream in a resource that relates to the object, the object further defining a text as its related resource for controlling the display; and means for controlling execution of the particular application.

4. An intelligent digital television receiver comprising:

means for receiving a video signal, an audio signal, and a digital data transmitted in a digital broadcast;

means for executing a particular application based on the received digital data by itself or in connection with the received video and audio signal;

means for controlling execution of a plurality of applications by generating events according to event start information, the event start information including time information contained in a digital data stream as an object which comprises an element of the particular application, the plurality of applications including the particular application;

means for controlling execution of the particular application; and a function for controlling a storage area of a state control table and an execution program, the function downloading the execution program as a resource to control the program according to a definition of the object.

5. An intelligent digital television receiver comprising:

means for receiving a video signal, an audio signal, and a digital data transmitted in a digital broadcast;

means for executing a particular application based on the received digital data by itself or in connection with the received video and audio signal;

means for controlling execution of a plurality of applications by generating events according to event start information, the event start information including time information contained in a digital data stream as an object which comprises an element of the particular application, the plurality of applications including the particular application;

means for controlling execution of the particular application; and a protocol system for transmitting and decoding information accompanied with a program according to an information amount comprised of information units and for selecting a necessary transmission time for the information units.

6. An intelligent digital television receiver as claimed in claim 5, wherein the protocol system comprises a first transmission protocol based on a software application, and a second transmission protocol based on a hardware application.

7. An intelligent digital television receiver, comprising:

judging means for receiving an input data including bitmap data having a certain number of pixels and possibly including vector data for judging whether the input data contains any vector data; and data generating means having a first input for receiving the bitmap data from the judging means and a second input for receiving the any vector data from the judging means and using the bitmap data and the any vector data for generating an output bitmap data having a different number of pixels from the bitmap data received by the judging means when the judging means determines that there is vector data contained in the input data, the data generating means alternately generating the output bitmap data from the bitmap data received by the judging means when the judging means determines that there is no vector data contained in the input data.

8. An intelligent digital television receiver, comprising:

judging means for receiving an input data including bitmap data having a certain number of pixels and possibly including vector data for judging whether the input data contains any vector data;

vector data generating means having an input for receiving the bitmap data from the judging means for generating an output vector data from the bitmap data when the judging means determines that vector data is not contained in the input data; and data generating means having a first input for receiving the bitmap data from the judging means and a second input for receiving either the vector data from the judging means or the output vector data from the vector data generating means and using the bitmap data from the judging means and the vector data from the judging means for generating an output bitmap data having a different number of pixels from the bitmap data received by the judging means when the judging means determines that there is vector data contained in the input data, the data generating means alternately generating the output bitmap data from the bitmap data received by the judging means and the output vector data from the vector data generating means when the judging means determines that there is no vector data contained in the input data.

* * * * *